United States Patent
Gharavi et al.

(10) Patent No.: US 10,181,866 B2
(45) Date of Patent: Jan. 15, 2019

(54) MULTI-BEAM OUTPHASING TRANSMITTERS

(71) Applicant: Movandi Corporation, Newport Beach, CA (US)

(72) Inventors: Sam Gharavi, Irvine, CA (US); Ahmadreza Rofougaran, Newport Coast, CA (US); Maryam Rofougaran, Rancho Palos Verdes, CA (US); Farid Shirinfar, Granada Hills, CA (US)

(73) Assignee: Movandi Corporation, Newport Beach, CA (US)

( * ) Notice: Subject to any disclaimer, the term of this patent is extended or adjusted under 35 U.S.C. 154(b) by 72 days.

(21) Appl. No.: 15/432,185

(22) Filed: Feb. 14, 2017

(65) Prior Publication Data

US 2018/0234120 A1    Aug. 16, 2018

(51) Int. Cl.
| | |
|---|---|
| *H04L 27/00* | (2006.01) |
| *H04B 1/04* | (2006.01) |
| *H04B 7/06* | (2006.01) |
| *H04B 7/0408* | (2017.01) |
| *H04B 7/10* | (2017.01) |

(52) U.S. Cl.
CPC ............ *H04B 1/04* (2013.01); *H04B 7/0408* (2013.01); *H04B 7/0617* (2013.01); *H04B 7/10* (2013.01); *H04B 2001/0408* (2013.01)

(58) Field of Classification Search
CPC .... H04B 1/04; H04B 7/10; H04B 2001/0416; H03F 1/3247; H03F 3/24; H03F 1/3241; H04L 27/368; H04L 1/0003; H04L 1/0071; H04L 5/0007; H04L 1/0009; H04L 27/0008; H03G 3/3042

USPC ................. 375/295, 297, 316, 219
See application file for complete search history.

(56) References Cited

U.S. PATENT DOCUMENTS

| | | |
|---|---|---|
| 6,307,502 B1 | 10/2001 | Marti-Canales |
| 8,482,462 B2 | 7/2013 | Komijani |
| | (Continued) | |

OTHER PUBLICATIONS

Baggett, Benjamin M.W. *Optimization of Aperiodically Spaced Phased Arrays for Wideband Applications*. MS Thesis. Virginia Polytechnic Institute and State University, 2011. pp. 1-137.

*Primary Examiner* — Zewdu Kassa
(74) *Attorney, Agent, or Firm* — Farajami & Farajami LLP

(57) ABSTRACT

An outphasing transmitter includes a combiner, a decomposition block, first and second power amplifiers, and antennas in a phased array antenna panel. The combiner combines a plurality of beamforming signals into a composite input signal. The decomposition block decomposes the composite input signal into first and second decomposed radio frequency (RF) signals coupled to the first and second power amplifiers. Non-overlapping sub-arrays of the antennas may be uniquely associated with the first and second power amplifiers. Alternatively, groups of interleaved antenna rows may be uniquely associated with the first and second power amplifiers. Alternatively, random pluralities of the antennas may be randomly hard-wired to the first and second power amplifiers. Alternatively, pluralities of the antennas may be dynamically and selectably assigned to the first and second power amplifiers. The phased array antenna panel forms a plurality of RF beams corresponding to the plurality of RF beamforming signals.

20 Claims, 20 Drawing Sheets

(56) References Cited

U.S. PATENT DOCUMENTS

2010/0149039 A1\* 6/2010 Komijani ............. H04B 7/0617
          342/377
2014/0035731 A1 2/2014 Chan
2015/0341098 A1\* 11/2015 Angeletti ................ H01Q 3/40
          375/267

\* cited by examiner

| $\theta$ | $\varphi$ | ANTENNA ASSIGNMENTS |
|---|---|---|
| $\theta_i$ | $\varphi_l$ | S1, S1, S2, S2, S2, ... S1 |
| | $\varphi_m$ | S1, S1, S1, S2, S2, ... S2 |
| | $\varphi_n$ | S1, S1, S1, S1, S2, ... S2 |
| ⋮ | ⋮ | ⋮ |
| $\theta_j$ | $\varphi_l$ | S2, S2, S2, S1, S2, ... S2 |
| | $\varphi_m$ | S2, S1, S2, S2, S1, ... S1 |
| | $\varphi_n$ | S2, S2, S1, S2, S2, ... S2 |
| ⋮ | ⋮ | ⋮ |
| $\theta_k$ | $\varphi_l$ | S2, S1, S1, S1, S2, ... S1 |
| | $\varphi_m$ | S1, S2, S1, S1, S2, ... S1 |
| | $\varphi_n$ | S2, S2, S1, S1, S1, ... S2 |
| ⋮ | ⋮ | ⋮ |

MULTI-BEAM OUTPHASING TRANSMITTERS

RELATED APPLICATION(S)

The present application is related to U.S. patent application Ser. No. 15/225,071, filed on Aug. 1, 2016, and titled "Wireless Receiver with Axial Ratio and Cross-Polarization Calibration," and U.S. patent application Ser. No. 15/225,523, filed on Aug. 1, 2016, and titled "Wireless Receiver with Tracking Using Location, Heading, and Motion Sensors and Adaptive Power Detection," and U.S. patent application Ser. No. 15/226,785, filed on Aug. 2, 2016, and titled "Large Scale Integration and Control of Antennas with Master Chip and Front End Chips on a Single Antenna Panel," and U.S. patent application Ser. No. 15/255,656, filed on Sep. 2, 2016, and titled "Novel Antenna Arrangements and Routing Configurations in Large Scale Integration of Antennas with Front End Chips in a Wireless Receiver," and U.S. patent application Ser. No. 15/256,038 filed on Sep. 2, 2016, and titled "Transceiver Using Novel Phased Array Antenna Panel for Concurrently Transmitting and Receiving Wireless Signals," and U.S. patent application Ser. No. 15/256,222 filed on Sep. 2, 2016, and titled "Wireless Transceiver Having Receive Antennas and Transmit Antennas with Orthogonal Polarizations in a Phased Array Antenna Panel," and U.S. patent application Ser. No. 15/278,970 filed on Sep. 28, 2016, and titled "Low-Cost and Low-Loss Phased Array Antenna Panel," and U.S. patent application Ser. No. 15/279,171 filed on Sep. 28, 2016, and titled "Phased Array Antenna Panel Having Cavities with RF Shields for Antenna Probes," and U.S. patent application Ser. No. 15/279,219 filed on Sep. 28, 2016, and titled "Phased Array Antenna Panel Having Quad Split Cavities Dedicated to Vertical-Polarization and Horizontal-Polarization Antenna Probes," and U.S. patent application Ser. No. 15/335,034 filed on Oct. 26, 2016, and titled "Lens-Enhanced Phased Array Antenna Panel," and U.S. patent application Ser. No. 15/335,179 filed on Oct. 26, 2016, and titled "Phased Array Antenna Panel with Configurable Slanted Antenna Rows," and U.S. patent application Ser. No. 15/355,967 filed on Nov. 18, 2016, and titled "Phased Array Antenna Panel with Enhanced Isolation and Reduced Loss," and U.S. patent application Ser. No. 15/356,172 filed on Nov. 18, 2016, and titled "Phased Array Antenna Panel Having Reduced Passive Loss of Received Signals," and U.S. patent application Ser. No. 15/432,018 filed on Feb. 14, 2017, and titled "Outphasing Transmit and Receive Wireless Systems Having Dual-Polarized Antennas," and U.S. patent application Ser. No. 15/432,091 filed on Feb. 14, 2017, and titled "Outphasing Transmitters with Improved Wireless Transmission Performance and Manufacturability." The disclosures of all of these related applications are hereby incorporated fully by reference into the present application.

BACKGROUND

Wireless transmitters utilizing phased array antenna panels employ a large number of power amplifiers to amplify radio frequency (RF) signals to transmit directed RF beams. Amplifying RF signals with time-varying amplitude (also referred to as "variable envelope signals") is not as power efficient as amplifying RF signals with constant amplitude (also referred to as "constant envelope signals"). Moreover, power amplifiers utilized to amplify and transmit constant envelope signals are less non-linear and introduce less distortion as compared to power amplifiers utilized to amplify and transmit variable envelope signals. On the other hand, communicating using RF signals with time-varying amplitude is more spectral efficient than communicating using RF signals with constant amplitude.

In one solution, a variable amplitude signal is decomposed into two constant amplitude signals, and the two constant amplitude signals are amplified using two separate power amplifiers. The two constant amplitude signals are then transmitted over the air by respective antennas. One shortcoming of this solution is that path differences of the two constant amplitude signals will increase the error vector magnitude (EVM). Additionally, particularly in high-frequency applications, phased array antenna panels may transmit RF beams in unintended directions (also referred to as "grating lobes"), interfering with proper reception of intended RF beams. This effect is exacerbated where a phased array antenna panel transmits multiple intended RF beams.

Thus, there is a need in the art to use phased array antenna panels having constant amplitude decomposed RF signals to achieve a transmitter and a wireless communication system that overcome the deficiencies in the art.

SUMMARY

The present disclosure is directed to multi-beam outphasing transmitters, substantially as shown in and/or described in connection with at least one of the figures, and as set forth in the claims.

BRIEF DESCRIPTION OF THE DRAWINGS

FIG. 14 illustrates an exemplary lookup table according to one implementation of the present application.

DETAILED DESCRIPTION

Figure 1:
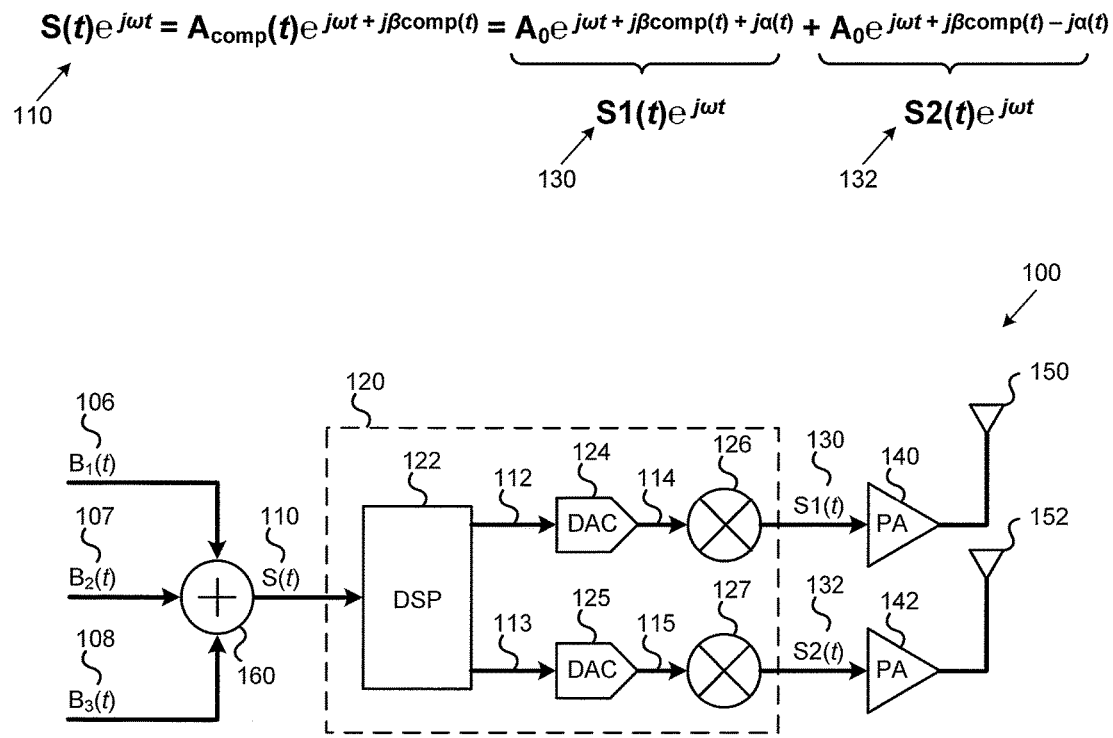
FIG. 1 illustrates an exemplary system diagram of a portion of an exemplary outphasing transmitter according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates an exemplary system diagram of a portion of an exemplary outphasing transmitter according to one implementation of the present application. As illustrated in FIG. 1, outphasing transmitter 100 includes combiner 160, decomposition block 120, having digital signal processor (DSP) 122, digital-to-analog converters (DACs) 124 and 125, and mixers 126 and 127, power amplifiers 140 and 142, and antennas 150 and 152.

As illustrated in FIG. 1, beamforming signals 106, 107, and 108 are provided to combiner 160. Beamforming signals 106, 107, and 108 are generally amplitude and phase modulated signals. For example, beamforming signal 106 may carry amplitude and phase information for an antenna in a phased array antenna panel to contribute to formation of a first RF beam. Similarly, beamforming signals 107 and 108 may carry amplitude and phase information for the antenna to contribute to formation of second and third RF beams respectively. Beamforming signals 106, 107, and 108 may be provided by a modem or a radio frequency (RF) front end chip (not shown in FIG. 1) in a phased array antenna panel configured to provide amplitude and phase shifted signals in response to control signals received from a master chip in the phased array antenna panel (not shown in FIG. 1). An example of such phased array antenna panel, utilizing RF front end chips and a master chip is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. In one implementation, an RF front end chip may include components of outphasing transmitter 100, such as combiner 160, decomposition block 120, and power amplifiers 140 and 142. In one implementation, a single RF front end chip may be associated with two antennas, such as antennas 150 and 152. In various implementations, a single RF front end chip may be associated with four, six, eight, sixteen, or any number of antennas. Various examples of association of RF front end chips with different numbers and arrangements of antennas is described in U.S. patent application Ser. No. 15/255,656 filed on Sep. 2, 2016, and titled "Novel Antenna Arrangements and Routing Configurations in Large Scale Integration of Antennas with Front End Chips in a Wireless Receiver." The disclosure in this related application is hereby incorporated fully by reference into the present application.

In the present implementation, beamforming signals 106, 107, and 108 are variable envelope signals defined by $B_1(t)$ 106, $B_2(t)$ 107, and $B_3(t)$ 108 respectively in equations (1), (2), and (3) below:

$$B_1(t)=A_1(t)e^{j\omega t+j\beta 1(t)} \quad\quad\quad \text{Equation (1)}$$

$$B_2(t)=A_2(t)e^{j\omega t+j\beta 2(t)} \quad\quad\quad \text{Equation (2)}$$

$$B_3(t)=A_3(t)e^{j\omega t+j\beta 3(t)} \quad\quad\quad \text{Equation (3)}$$

where $B_1(t)$, $B_2(t)$, and $B_3(t)$ represent the beamforming signals, and $A_1(t)$, $A_2(t)$, and $A_3(t)$ represent the time varying envelopes.

As shown in FIG. 1, combiner 160 is configured to combine beamforming signals 106, 107, and 108 into composite input signal 110. In the present implementation, composite input signal 110 is a variable envelope signal defined by S(t) 110 in equation (4) below:

$$S(t)e^{j\omega t}=A_{comp}(t)e^{j\omega t+j\beta comp(t)} \quad\quad\quad \text{Equation (4)}$$

where S(t) represents the composite input signal, and $A_{comp}(t)$ represents the time varying envelope. In various implementations, combiner 160 may combine more or fewer beamforming signals into composite input signal 110.

As shown in FIG. 1, decomposition block 120 is configured to decompose variable amplitude (or variable envelope) composite input signal 110 into constant amplitude (or constant envelope) decomposed RF signals 130 and 132. In decomposition block 120, DSP 122 decomposes variable amplitude composite input signal 110 into constant amplitude decomposed digital signals 112 and 113. DSP 122 may be implemented, for example, using a field-programmable gate array (FPGA) chip. DSP 122 is coupled to DACs 124 and 125. DACs 124 and 125 convert the constant amplitude decomposed digital signals 112 and 113 into constant amplitude decomposed analog signals 114 and 115 respectively. DACs 124 and 125 are coupled to mixers 126 and 127 respectively. Mixers 126 and 127 upconvert constant amplitude decomposed analog signals 114 and 115 into constant amplitude decomposed RF signals 130 and 132. Decomposition block 120 outputs constant amplitude decomposed RF signals 130 and 132. Decomposition block 120 may include additional components, such as additional signal conditioning circuitry.

In the present implementation, decomposed RF signals 130 and 132 are constant amplitude RF signals defined by respective constant amplitude components S1($t$) 130 and S2($t$) 132 in equation (5) below.

$$S(t)e^{j\omega t} = A_{comp}(t)e^{j\omega t + j\beta comp(t)} =$$
$$\underbrace{A_0 e^{j\omega t + j\beta comp(t) + j\alpha(t)}}_{S1(t)e^{j\omega t}} + \underbrace{A_0 e^{j\omega t + j\beta comp(t) - j\alpha(t)}}_{S2(t)e^{j\omega t}} \quad \text{Equation (5)}$$

where S1($t$) and S2($t$) represent the decomposed RF signals, $A_0$ represents the constant amplitude (or constant envelope) of S1($t$) and S2($t$), and j$\omega$t+j$\beta$comp(t)+j$\alpha$(t) and j$\omega$t+j$\beta$comp(t)+−j$\alpha$(t) represent the variable phase information using the two variables $\beta$ and $\alpha$. Further details regarding decomposition of a variable amplitude signal into constant amplitude signals (also referred to as "outphasing") can be found in U.S. Pat. No. 8,482,462 issued to Komijani et al., which is fully incorporated herein by reference.

As illustrated in FIG. 1, decomposition block 120 is coupled to power amplifiers 140 and 142. Power amplifiers 140 and 142 amplify constant amplitude decomposed RF signals 130 and 132 respectively. Power amplifiers 140 and 142 can be placed sufficiently apart from each other and provided respective RF shields so as to minimize any inter-modulation or interference between these two power amplifiers.

In the present implementation, power amplifiers 140 and 142 are coupled to antennas 150 and 152 respectively. In an alternative implementation, power amplifiers 140 and 142 may be respectively coupled to a vertically-polarized probe and a horizontally-polarized probe of a dual-polarized antenna. Antennas 150 and 152 may be, for example, patch antennas, dipole antennas, or slot antennas. Antennas 150 and 152 may be part of a phased array antenna panel (not shown in FIG. 1). In practice, for example when used in conjunction with 5G wireless communications (5th generation mobile networks or 5th generation wireless systems), a phased array antenna panel may have one hundred and forty four (144) antennas. When used in conjunction with commercial geostationary communication satellites or low earth orbit satellites, a phased array antenna panel may be even larger, and have, for example, four hundred (400) antennas. In other examples, a phased array antenna panel may have any other number of antennas. In one implementation, a single power amplifier 140 (or 142) is coupled to a single antenna 150 (or 152). In various implementations, a single power amplifier 140 (or 142) may be coupled to four, six, eight, sixteen, or any number of antennas 150 (or 152). For example, power amplifier 140 (or 142) may be coupled to a plurality of antennas 150 (or 152), using, for example, a splitter, a plurality of amplifier cells, or other suitable means. Thus, antennas 150 (or 152) may transmit amplified constant amplitude decomposed RF signal 130 (or 132).

By decomposing variable amplitude composite input signal 110 into constant amplitude decomposed RF signals 130 and 132 prior to their amplification, power amplifiers 140 and 142 operate with more power efficiency. Moreover, power amplifiers 140 and 142 exhibit less non-linearity and introduce less distortion than would a power amplifier utilized to amplify variable amplitude composite signal 110 without decomposition. In addition, a combiner is not utilized to combine the outputs of power amplifiers 140 and 142, thus avoiding loss or inter-modulation between power amplifiers 140 and 142. Thus, outphasing transmitter 100 efficiently transmits constant amplitude decomposed RF signal 130 using antenna 150, and efficiently transmits constant amplitude decomposed RF signal 132 using antenna 152.

Figure 2:
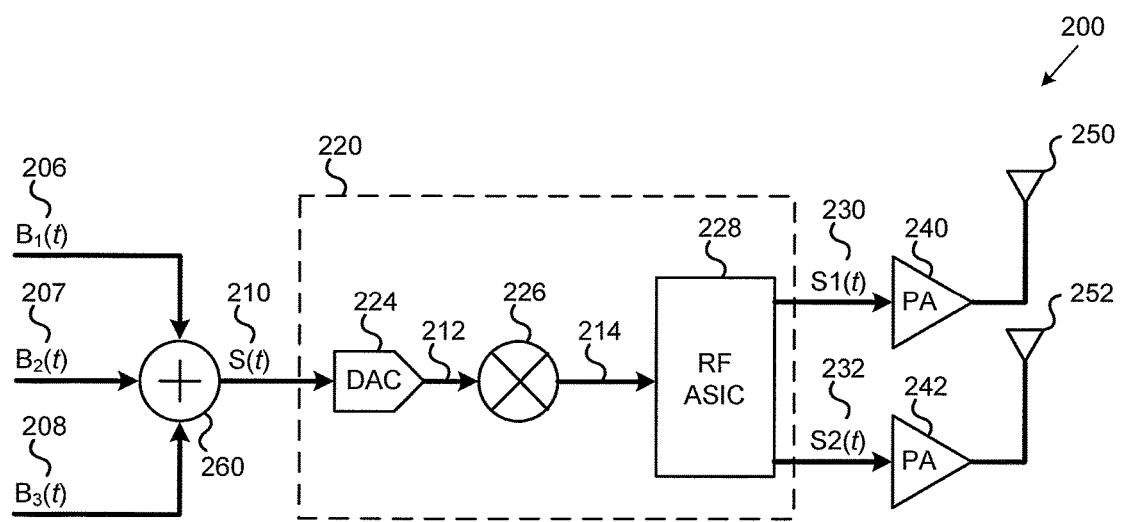
FIG. 2 illustrates an exemplary system diagram of a portion of an exemplary outphasing transmitter according to one implementation of the present application.

FIG. 2 illustrates an exemplary system diagram of a portion of an exemplary outphasing transmitter according to one implementation of the present application. As illustrated in FIG. 2, outphasing transmitter 200 includes combiner 260, decomposition block 220, having DAC 224, mixer 226, and RF application-specific integrated circuit (RF ASIC) 228, power amplifiers 240 and 242, and antennas 250 and 252.

As illustrated in FIG. 2, beamforming signals 206, 207, and 208 are provided to combiner 260. Beamforming signals 206, 207, and 208 are generally amplitude and phase modulated signals. For example, beamforming signal 206 may carry amplitude and phase information for an antenna in a phased array antenna panel to contribute to formation of a first RF beam. Similarly, beamforming signals 207 and 208 may carry amplitude and phase information for the antenna to contribute to formation of second and third RF beams respectively. Beamforming signals 206, 207, and 208 may be provided by a modem or a radio frequency (RF) front end chip (not shown in FIG. 2) in a phased array antenna panel configured to provide amplitude and phase shifted signals in response to control signals received from a master chip in the phased array antenna panel (not shown in FIG. 2). An example of such phased array antenna panel, utilizing RF front end chips and a master chip is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. In one implementation, an RF front end chip may include components of outphasing transmitter 200, such as combiner 260, decomposition block 220, and power amplifiers 240 and 242. In one implementation, a single RF front end chip may be associated with two antennas, such as antennas 250 and 252. In various implementations, a single RF front end chip may be associated with four, six, eight, sixteen, or any number of antennas. Various examples of association of RF front end chips with different numbers and arrangements of antennas is described in U.S. patent application Ser. No. 15/255,656 filed on Sep. 2, 2016, and titled "Novel Antenna Arrangements and Routing Configurations in Large Scale Integration of Antennas with Front End Chips in a Wireless Receiver." The disclosure in this related application is hereby incorporated fully by reference into the present application.

In the present implementation, beamforming signals 206, 207, and 208 are variable envelope signals defined by $B_1(t)$, $B_2(t)$, and $B_3(t)$ respectively in equations (1), (2), and (3) above. As shown in FIG. 2, combiner 260 is configured to combine beamforming signals 206, 207, and 208 into composite input signal 210. In the present implementation, composite input signal 210 is a variable envelope signal defined by S(t) in equation (4) above. In various implementations, combiner 260 may combine more or fewer beamforming signals into composite input signal 210.

As shown in FIG. 2, decomposition block 220 is configured to decompose variable amplitude (or variable envelope) composite input signal 210 into constant amplitude (or constant envelope) decomposed RF signals 230 and 232. In decomposition block 220, DAC 224 converts variable amplitude composite input signal 210 into variable amplitude analog signal 212. DAC 224 is coupled to mixer 226. Mixer 226 upconverts variable amplitude analog signal 212 into variable amplitude RF signal 214. Mixer 226 is coupled to RF ASIC 228. RF ASIC 228 decomposes variable amplitude RF signal 214 into constant amplitude decomposed RF signals 230 and 232. Decomposition block 220 outputs constant amplitude decomposed RF signals 230 and 232. Decomposition block 220 may include additional components, such as additional signal conditioning circuitry. In the present implementation, decomposed RF signals 230 and 232 are constant amplitude RF signals defined by respective constant amplitude components S1(t) and S2(t) in equation (5) above.

As illustrated in FIG. 2, decomposition block 220 is coupled to power amplifiers 240 and 242. Power amplifiers 240 and 242 amplify constant amplitude decomposed RF signals 230 and 232 respectively. Power amplifiers 240 and 242 can be placed sufficiently apart from each other and provided respective RF shields so as to minimize any inter-modulation or interference between these two power amplifiers.

In the present implementation, power amplifiers 240 and 242 are coupled to antennas 250 and 252 respectively. In an alternative implementation, power amplifiers 240 and 242 may be respectively coupled to a vertically-polarized probe and a horizontally-polarized probe of a dual-polarized antenna. Antennas 250 and 252 may be, for example, patch antennas, dipole antennas, or slot antennas. Antennas 250 and 252 may be part of a phased array antenna panel (not shown in FIG. 2). In practice, for example when used in conjunction with 5G wireless communications (5th generation mobile networks or 5th generation wireless systems), a phased array antenna panel may have one hundred and forty four (144) antennas. When used in conjunction with commercial geostationary communication satellites or low earth orbit satellites, a phased array antenna panel may be even larger, and have, for example, four hundred (400) antennas. In other examples, a phased array antenna panel may have any other number of antennas. In one implementation, a single power amplifier 240 (or 242) is coupled to a single antenna 250 (or 252). In various implementations, a single power amplifier 240 (or 242) may be coupled to four, six, eight, sixteen, or any number of antennas 250 (or 252). For example, power amplifier 240 (or 242) may be coupled to a plurality of antennas 250 (or 252), using, for example, a splitter, a plurality of amplifier cells, or other suitable means. Thus, antennas 250 (or 252) may transmit amplified constant amplitude decomposed RF signal 230 (or 232).

By decomposing variable amplitude composite input signal 210 into constant amplitude decomposed RF signals 230 and 232 prior to their amplification, power amplifiers 240 and 242 operate with more power efficiency. Moreover, power amplifiers 240 and 242 exhibit less non-linearity and introduce less distortion than would a power amplifier utilized to amplify variable amplitude composite signal 210 without decomposition. In addition, a combiner is not utilized to combine the outputs of power amplifiers 240 and 242, thus avoiding loss or inter-modulation between power amplifiers 240 and 242. Thus, outphasing transmitter 200 efficiently transmits constant amplitude decomposed RF signal 230 using antenna 250, and efficiently transmits constant amplitude decomposed RF signal 232 using antenna 252.

Figure 3:
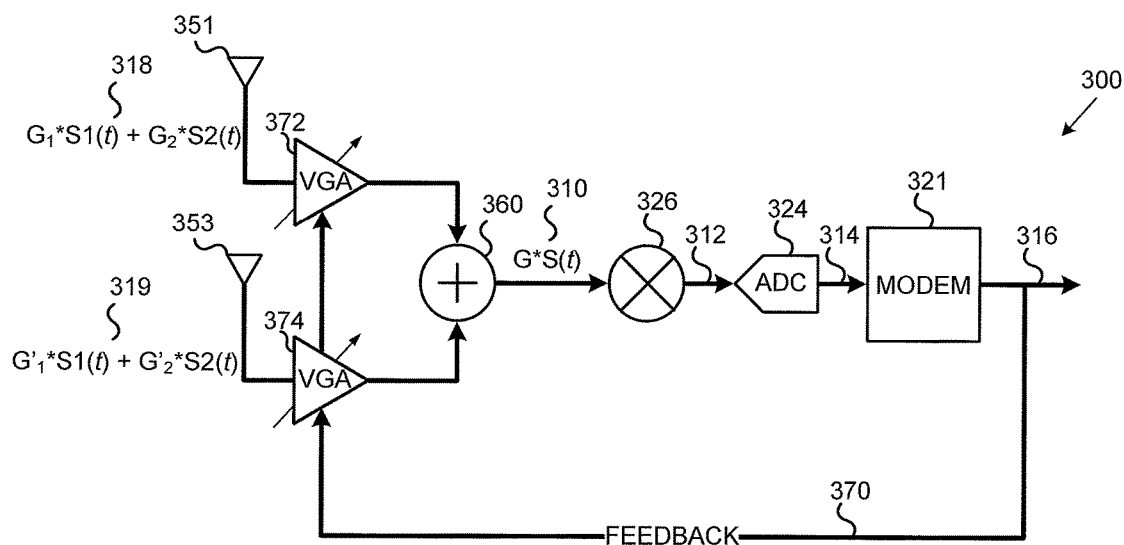
FIG. 3 illustrates an exemplary system diagram of a portion of an exemplary outphasing receiver according to one implementation of the present application.

FIG. 3 illustrates an exemplary system diagram of a portion of an exemplary outphasing receiver according to one implementation of the present application. As illustrated in FIG. 3, outphasing receiver 300 includes antennas 351 and 353, VGAs 372 and 374, combiner 360, mixer 326, ADC 324, modem 321, output digital signal 316, and feedback line 370.

Outphasing receiver 300 in FIG. 3 can be used in conjunction with outphasing transmitter 100 of FIG. 1 or outphasing transmitter 200 of FIG. 2. In the present implementation, constant amplitude decomposed RF signals 130 and 132 (or 230 and 232) transmitted by respective antennas 150 and 152 (or 250 and 252) of outphasing transmitter 100 (or 200) combine over the air through superposition. Antennas 351 and 353 of outphasing receiver 300 each receive a variable amplitude composite RF signal that corresponds to the original variable amplitude composite input signal 110 (or 210). More specifically, antennas 351 and 353 receive variable amplitude composite RF signals, defined by $G_1*S1(t)+G_2*S2(t)$ 318 and $G'_1*S1(t)+G'_2*S2(t)$ 319 respectively, where $G_1$ and $G_2$ are gains at antennas 351 and 353 respectively. Antennas 351 and 353 may be, for example, patch antennas, dipole antennas, or slot antennas. In one implementation, outphasing receiver 300 may include dual-polarized antennas having vertically-polarized probes and horizontally-polarized probes.

As illustrated in FIG. 3, antennas 351 and 353 are coupled to combiner 360 through VGAs 372 and 374 respectively. VGAs 372 and 374 amplify variable amplitude composite RF signals 318 and 319 respectively, and combiner 360 combines variable amplitude composite RF signals 318 and 319 into a scaled variable amplitude composite RF signal, defined by G*S(t) 310. Antennas 351 and 353 may be part of a phased array antenna panel (not shown in FIG. 3) that may have any other number of antennas, as stated above. In various implementations, combiner 360 may combine variable amplitude composite RF signals from four, six, eight, sixteen, or any number of antennas.

Combiner 360 is coupled to mixer 326. Mixer 326 downconverts scaled variable amplitude composite RF signal 310 into scaled variable amplitude composite analog signal 312. Mixer 326 is coupled to ADC 324. ADC 324 converts scaled variable amplitude composite analog signal 312 into scaled variable amplitude composite digital signal 314. ADC 324 is coupled to modem 321. Modem 321 produces an output digital signal 316 based on scaled variable amplitude composite digital signal 314. In one implementation, an RF front end chip in a phased array antenna panel may include components of outphasing receiver 300, such as VGAs 372 and 374, combiner 360, mixer 326, ADC 324, and modem 321. Components of outphasing receiver 300 may be coupled in an order other than the order described herein. Outphasing receiver 300 may include additional components, such as additional signal conditioning circuitry.

As further illustrated in FIG. 3, modem 321 is coupled to feedback line 370. Different paths taken by constant amplitude decomposed RF signals, such as different paths taken by decomposed RF signals 130 and 132 (or 230 and 232), can cause imbalance in both gain and phase, and result in an increased bit error rate (BER) for the output digital signal 316 at the receiver. Outphasing receiver 300 can apply gain and phase adjustment to variable amplitude composite RF signals 318 and 319 using feedback line 370 in order to compensate for such imbalance. For example, as show in FIG. 3, antennas 351 and 353 are coupled to VGAs 372 and 374 respectively and variable amplitude composite RF signals 318 and 319 are input to VGAs 372 and 374 respectively. Feedback line 370 couples modem 321 to VGAs 372 and 374. Feedback line 370 uses the BER as feedback to adjust the gain of VGAs 372 and 374 to compensate for gain imbalance and decrease the BER. Feedback line 370 may include additional components, such as phase adjustment circuitry.

Figure 4:
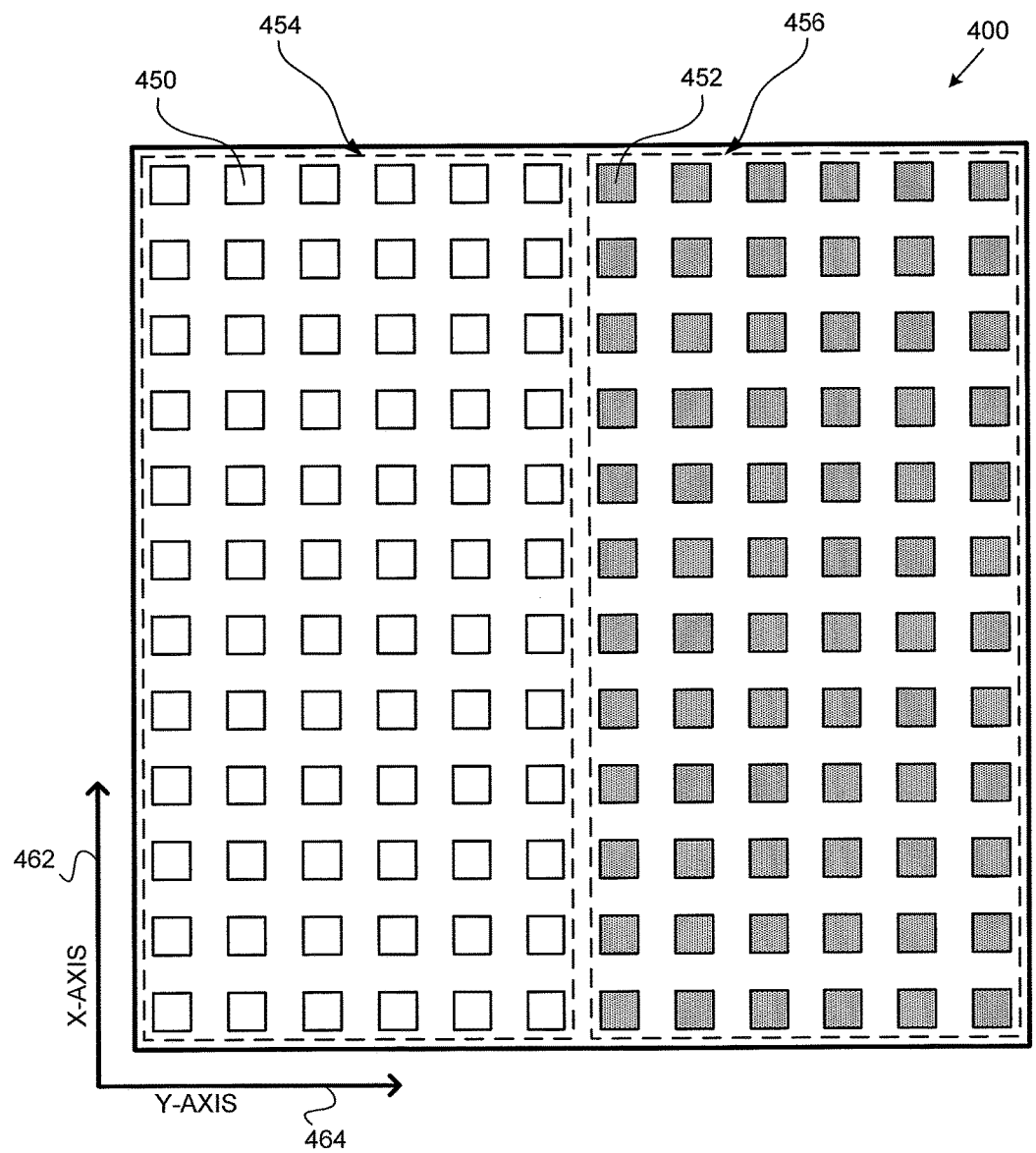
FIG. 4 illustrates a layout diagram of a portion of an exemplary phased array antenna panel according to one implementation of the present application.

FIG. 4 illustrates a layout diagram of a portion of an exemplary phased array antenna panel according to one implementation of the present application. As illustrated in FIG. 4, phased array antenna panel 400 includes a plurality of antennas 450 (unshaded in the drawings) and a plurality of antennas 452 (shaded in the drawings). In the present implementation, antennas 450 and 452 have a square shape and are arranged in a grid pattern in phased array antenna panel 400. In one implementation, the distance between one antenna and an adjacent antenna is a fixed distance, such as a quarter wavelength (i.e., $\lambda/4$). FIG. 4 shows one hundred and forty four (144) antennas 450 and 452 arranged in a twelve (12) by twelve (12) grid pattern, which may be used in conjunction with 5G wireless communications (5th generation mobile networks or 5th generation wireless systems). However, only a portion of phased array antenna panel 400 may be shown in FIG. 4. For example, when used in conjunction with commercial geostationary communication satellites or low earth orbit satellites, phased array antenna panel 400 may be even larger, and have, for example, four hundred (400) antennas 450 and 452. In other examples, phased array antenna panel 400 may have any other number of antennas 450 and 452. In one implementation, antennas 450 and 452 may have a shape other than a square, such as a circle. In practice, antenna probes (not shown in FIG. 4) may be situated in or over cubical or cylindrical cavities that accommodate more efficient transmission or reception of RF signals. Thus, antenna elements 450 and 452 in FIG. 4 may represent a top view of a cubical cavity housing antenna probes. Examples of various antennas that can be used in various implementations of the present application are shown and described in U.S. patent application Ser. No. 15/278,970 filed on Sep. 28, 2016 and titled "Low-Cost and Low-Loss Phased Array Antenna Panel," and U.S. patent application Ser. No. 15/279,171 filed on Sep. 28, 2016 and titled "Phased Array Antenna Panel Having Cavities with RF Shields for Antenna Probes." The disclosures in these related applications are hereby incorporated fully by reference into the present application. In one implementation, antennas 450 and 452 may be arranged in a pattern other than a grid. In one implementation, the distance between one antenna and an adjacent antenna may be greater than a quarter wavelength (i.e., greater than $\lambda/4$).

In the present implementation, phased array antenna panel 400 is a flat panel array lying in the xy-plane, defined by x-axis 462 and y-axis 464, employing antennas 450 and 452 coupled to associated active circuits to form beams for transmission. In one implementation, the beams are formed fully electronically by means of phase and amplitude control circuits associated with antennas 450 and 452. An example of beam forming using phase and amplitude control circuits utilizing a phased array antenna panel is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. Thus, phased array antenna panel 400 can provide fully electronic beamforming without the use of mechanical parts.

Phased array antenna panel 400 in FIG. 4 may be used as part of an outphasing transmitter, such as outphasing transmitter 100 of FIG. 1 or outphasing transmitter 200 of FIG. 2. Any of antennas 450 in FIG. 4 generally corresponds to antenna 150 (or 250), and any of antennas 452 in FIG. 4 generally corresponds to antenna 152 (or 252). In one implementation, a single power amplifier 140 (or 240) is coupled to a single one of antennas 450. In various implementations, a single power amplifier 140 (or 240) may be coupled to four, six, eight, sixteen, or any number of antennas 450. For example, power amplifier 140 (or 240) may be coupled to each of antennas 450, using, for example, a splitter, a plurality of amplifier cells, or other suitable means. Likewise, a single power amplifier 142 (or 242) may be coupled to one or any number of antennas 452. Thus, in FIG. 4, constant amplitude decomposed RF signal 130 (or 230) is provided to each of antennas 450 in phased array antenna panel 400, and constant amplitude decomposed RF signal 132 (or 232) is provided to each of antennas 452 in phased array antenna panel 400.

As illustrated in FIG. 4, phased array antenna panel 400 includes non-overlapping sub-arrays 454 and 456. Non-overlapping sub-array 454 includes antennas 450 uniquely associated with power amplifiers that transmit constant amplitude decomposed RF signal 130 (or 230) (i.e., constant amplitude component $S1(t)$ in equation (5) above). Non-overlapping sub-array 456 includes antennas 452 uniquely associated with power amplifiers that transmit constant amplitude decomposed RF signal 132 (or 232) (i.e., constant amplitude component $S2(t)$ in equation (5) above). In the present implementation, each of antennas 450 in non-overlapping sub-array 454 is uniquely associated with power amplifier 140 (or 240), and is not associated with power amplifier 142 (or 242). Conversely, each of antennas 452 in non-overlapping sub-array 456 is uniquely associated with power amplifier 142 (or 242), and is not associated with power amplifier 140 (or 240). In one implementation, antennas 450 in non-overlapping sub-array 454 may be uniquely associated with more than one power amplifier 140 (or 240), while not being associated with any power amplifier 142 (or 242). In one implementation, antennas 452 in non-overlapping sub-array 456 may be uniquely associated with more than one power amplifier 142 (or 242), while not being associated with any power amplifier 140 (or 240). As used herein, the term "non-overlapping sub-arrays" refers to the fact that phased array antenna panel 400 can be bisected into two sides such that no sub-array has an antenna on both sides. For example, phased array antenna panel 400 can be bisected into left and right sides by a line parallel to x-axis 462 located between non-overlapping sub-arrays 454 and 456 such that neither sub-array has an antenna on both the left and right sides; antennas 450 of non-overlapping sub-array 454 are on the left side and antennas 452 of non-overlapping sub-array 456 are on the right side.

In 5G wireless communications, and wireless communications in relation to commercial geostationary satellites, low earth orbit satellites, and other beamforming applications, a phased array antenna panel employs numerous power amplifiers that use much of the phased array antenna panel's power. By decomposing a variable amplitude composite input signal into constant amplitude decomposed RF signals 130 and 132 (or 230 and 232) prior to their amplification, power amplifiers in phased array antenna panel 400 can operate with more power efficiency and less non-linearity. Thus, phased array antenna panel 400 significantly improves power efficiency and performance in applications that employ numerous power amplifiers. As stated above, different paths taken by constant amplitude decomposed RF signals, such as different paths taken by constant amplitude decomposed RF signals 130 and 132 (or 230 and 232), can cause imbalance in both gain and phase, and increase the error vector magnitude (EVM). By utilizing a plurality of antennas 450 and 452 in non-overlapping sub-arrays 454 and 456, phased array antenna panel 400 suppresses stochastic imbalance between constant amplitude decomposed RF signals 130 and 132 (or 230 and 232). Thus, phased array antenna panel 400 significantly decreases EVM in applications that employ constant amplitude decomposed signals.

Figure 5A:
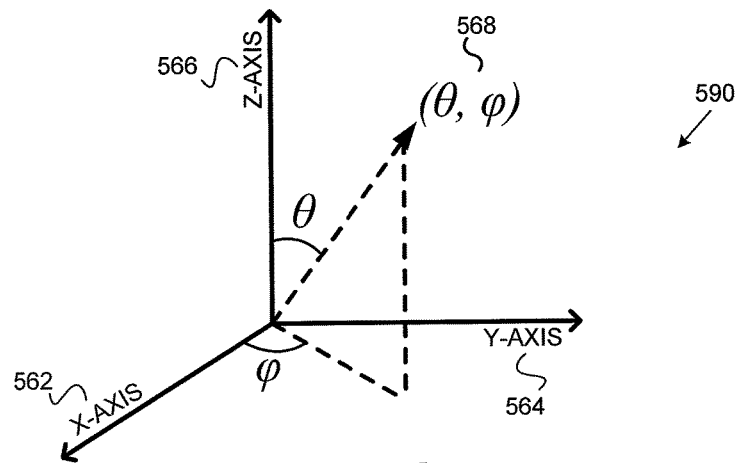
FIG. 5A illustrates a perspective view of a portion of an exemplary coordinate system in relation to one implementation of the present application.

FIG. 5A illustrates a perspective view of a portion of an exemplary coordinate system in relation to one implementation of the present application. As illustrated in FIG. 5A, coordinate system 590 includes x-axis 562, y-axis 564, z-axis 566. Phased array antenna panel 400 in FIG. 4 lies in the xy-plane of FIG. 5A, defined by x-axis 562 (corresponding to x-axis 462 in FIG. 4) and y-axis 564 (corresponding to y-axis 464 in FIG. 4). Phased array antenna panel 400 is configured to transmit an RF beam in direction 568, defined by (θ, φ). As used herein, θ represents the angle from z-axis 566 to a transmitted RF beam, and φ represents the angle from x-axis 562 to the transmitted RF beam.

Figure 5B:
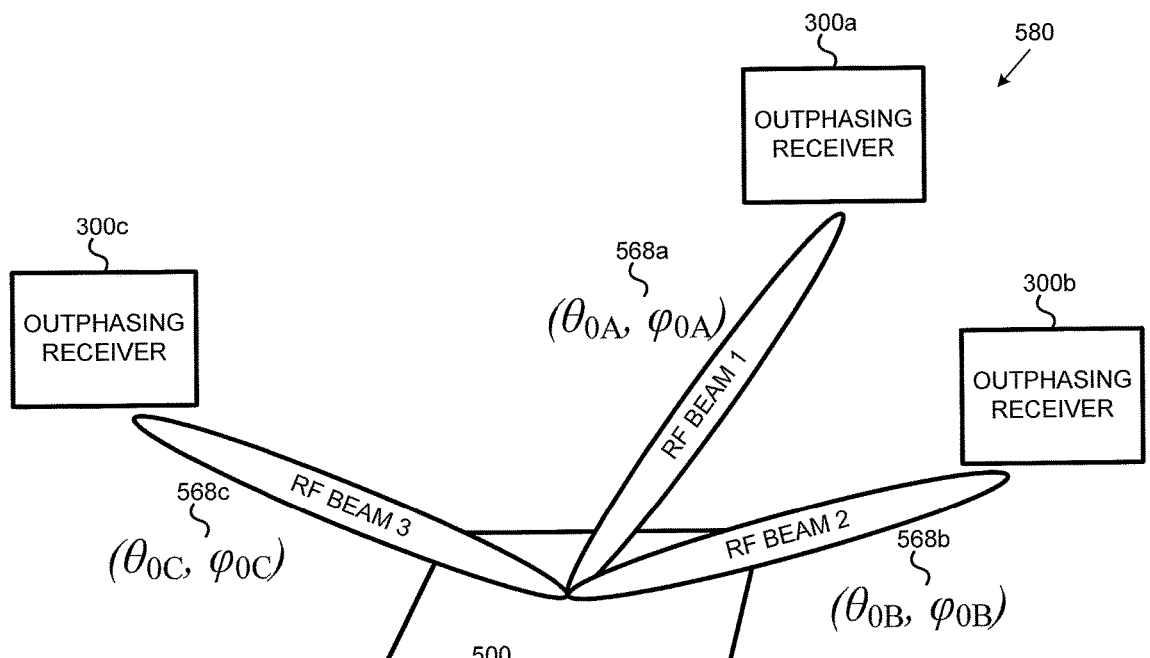
FIG. 5B illustrates an exemplary diagram of a portion of a wireless communication system according to one implementation of the present application.

FIG. 5B illustrates an exemplary diagram of a portion of a wireless communication system according to one implementation of the present application. As illustrated in FIG. 5B, wireless communication system 580 includes outphasing transmitter 500 and outphasing receivers 300a, 300b, and 300c. Outphasing transmitter 500 in FIG. 5B generally corresponds to outphasing transmitter 100 in FIG. 1 or outphasing transmitter 200 in FIG. 2. Outphasing receivers 300a, 300b, and 300c in FIG. 5B generally correspond to outphasing receiver 300 in FIG. 3. Outphasing transmitter 500 can be used in, for example, a base station in 5G that employs phased array antenna panels that can transmit multiple RF beams to various end-users in different directions.

As shown in FIG. 5B, outphasing transmitter 500 forms RF beam 1, RF beam 2, and RF beam 3 in directions 568a, 568b, and 568c, defined by ($\theta_{0A}$, $\varphi_{0A}$), ($\theta_{0B}$, $\varphi_{0B}$), and ($\theta_{0C}$, $\varphi_{0C}$) respectively. In the present implementation, constant amplitude decomposed RF signals 130 and 132 (or 230 and 232) transmitted by respective antennas 150 and 152 (or 250 and 252) of outphasing transmitter 500 combine over the air through superposition. Thus, outphasing receivers 300a, 300b, and 300c receive a variable amplitude composite RF signal that corresponds to the original variable amplitude composite input signal 110 (or 210). Because the original variable amplitude composite input signal 110 (or 210) is a combination of beamforming signals 106, 107, and 108 (or 206, 207, and 208), the variable amplitude composite RF signal experiences constructive interference in directions 568a, 568b, and 568c toward receivers 300a, 300b, and 300c thereby Ruining RF beams 1, 2, and 3. Thus, RF beams 1, 2, and 3 correspond to beamforming signals 106, 107, and 108 (or 206, 207, and 208) respectively. In various implementations, outphasing transmitter 500 may form more or fewer RF beams than shown in FIG. 5B. In various implementations, the RF beams may be narrower or broader than shown in FIG. 5B. In one implementation, the direction of an RF beam may be optimized to balance increased power at an intended receiver with decreased interference at other receivers. In various implementations, the direction of each RF beam may have a fixed separation or a minimum separation from the direction of an adjacent RF beam. For example, directions 568a, 568b, and 568c of RF beams 1, 2, and 3 respectively may have a fixed separation of fifteen degrees (15°), or a minimum separation of at least fifteen degrees (≥15°).

Figure 6:
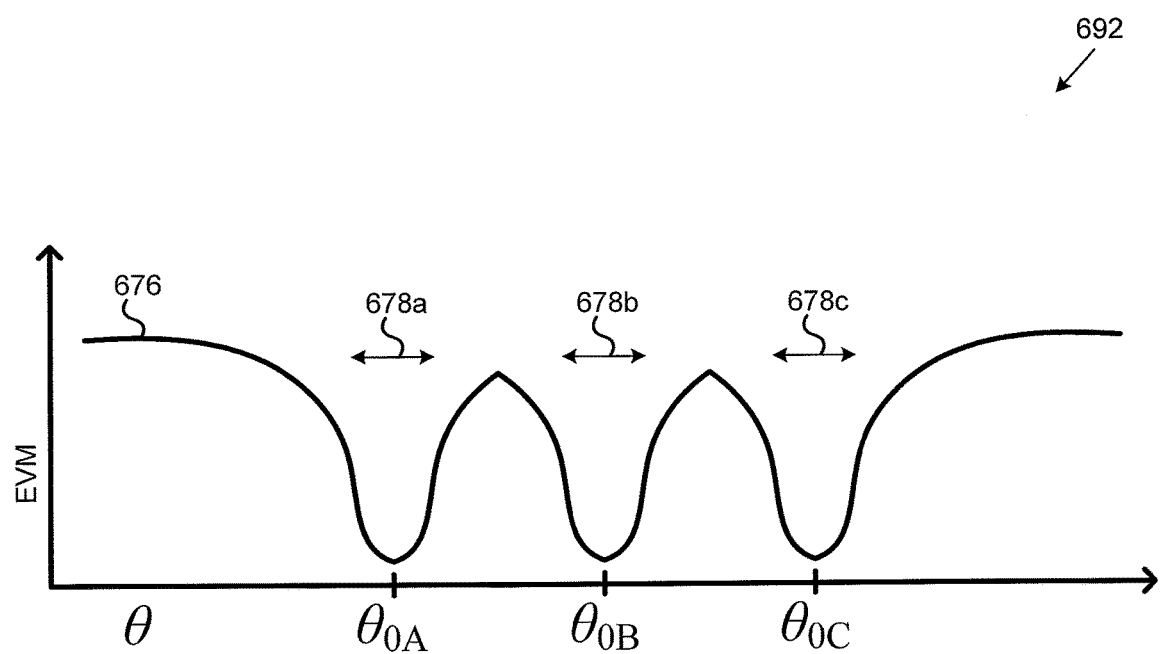
FIG. 6 illustrates a portion of an exemplary error vector magnitude (EVM) graph according to one implementation of the present application.

FIG. 6 illustrates a portion of an exemplary error vector magnitude (EVM) graph according to one implementation of the present application. As illustrated in FIG. 6, EVM graph 692 includes trace 676. Trace 676 represents the EVM for a phased array antenna panel, such as phased array antenna panel 400 in FIG. 4, versus RF beam angle θ. Relative dimensions of the EVM and RF beam angle θ shown in FIG. 6 may be exaggerated for the purposes of illustration. Accordingly, units and scales are omitted in FIG. 6.

As shown by trace 676 in FIG. 6, the EVM decreases to minima around $\theta_{0A}$, $\theta_{0B}$, and $\theta_{0C}$, where $\theta_{0A}$, $\theta_{0B}$, and $\theta_{0C}$ represent the intended transmitted RF beam angles. In one implementation, the EVM may decrease to more or fewer minima than shown in FIG. 6 and the transmitter may have more or fewer intended RF beam angles. An EVM below a certain threshold may be desirable for the transmitter design. Bandwidths 678a, 678b, and 678c represent ranges of RF beam angle θ for which the EVM is below a design threshold. However, narrow bandwidths 678a, 678b, and 678c limit the scan range of a transmitter.

Figure 7:
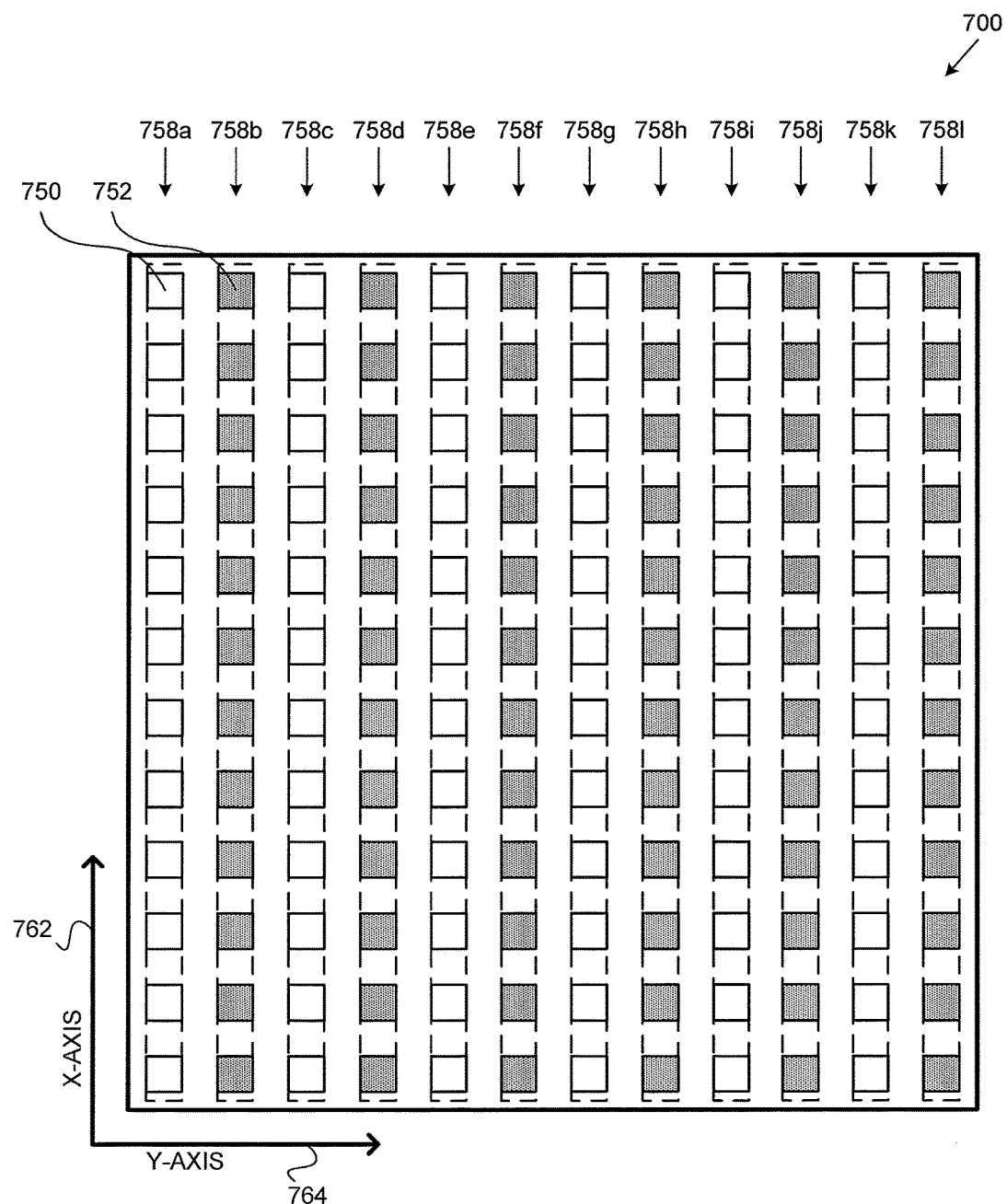
FIG. 7 illustrates a layout diagram of a portion of an exemplary phased array antenna panel according to one implementation of the present application.

FIG. 7 illustrates a layout diagram of a portion of an exemplary phased array antenna panel according to one implementation of the present application. As illustrated in FIG. 7, phased array antenna panel 700 includes a plurality of antennas 750 (unshaded in the drawings) and a plurality of antennas 752 (shaded in the drawings). In the present implementation, antennas 750 and 752 have a square shape and are arranged in a grid pattern in phased array antenna panel 700. In one implementation, the distance between one antenna and an adjacent antenna is a fixed distance, such as a quarter wavelength (i.e., λ/4). FIG. 7 shows one hundred and forty four (144) antennas 750 and 752 arranged in a twelve (12) by twelve (12) grid pattern, which may be used in conjunction with 5G wireless communications. However, only a portion of phased array antenna panel 700 may be shown in FIG. 7. For example, when used in conjunction with commercial geostationary communication satellites or low earth orbit satellites, phased array antenna panel 700 may be even larger, and have, for example, four hundred (400) antennas 750 and 752. In other examples, phased array antenna panel 700 may have any other number of antennas 750 and 752. In one implementation, antennas 750 and 752 may have a shape other than a square, such as a circle. In practice, antenna probes (not shown in FIG. 7) may be situated in or over cubical or cylindrical cavities that accommodate more efficient transmission or reception of RF signals. Thus, antenna elements 750 and 752 in FIG. 7 may represent a top view of a cubical cavity housing antenna probes. Examples of various antennas that can be used in various implementations of the present application are shown and described in U.S. patent application Ser. No. 15/278,970 filed on Sep. 28, 2016 and titled "Low-Cost and Low-Loss Phased Array Antenna Panel," and U.S. patent application Ser. No. 15/279,171 filed on Sep. 28, 2016 and titled "Phased Array Antenna Panel Having Cavities with RF Shields for Antenna Probes." The disclosures in these related applications are hereby incorporated fully by reference into the present application. In one implementation, antennas 750 and 752 may be arranged in a pattern other than a grid. In one implementation, the distance between one antenna and an adjacent antenna may be greater than a quarter wavelength (i.e., greater than λ/4).

In the present implementation, phased array antenna panel 700 is a flat panel array lying in the xy-plane, defined by x-axis 762 and y-axis 764, employing antennas 750 and 752 coupled to associated active circuits to form beams for transmission. In one implementation, the beams are formed fully electronically by means of phase and amplitude control circuits associated with antennas 750 and 752. An example of beam forming using phase and amplitude control circuits utilizing dual-polarized antennas is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. Thus, phased array antenna panel 700 can provide fully electronic beamforming without the use of mechanical parts.

Phased array antenna panel 700 in FIG. 7 may be used as part of an outphasing transmitter, such as outphasing transmitter 100 of FIG. 1 or outphasing transmitter 200 of FIG. 2. Any of antennas 750 in FIG. 7 generally corresponds to antenna 150 (or 250), and any of antennas 752 in FIG. 7 generally corresponds to antenna 152 (or 252). In one implementation, a single power amplifier 140 (or 240) is coupled to a single one of antennas 750. In various implementations, a single power amplifier 140 (or 240) may be coupled to four, six, eight, sixteen, or any number of antennas 750. For example, power amplifier 140 (or 240) may be coupled to each of antennas 750, using, for example, a splitter, a plurality of amplifier cells, or other suitable means. Likewise, a single power amplifier 142 (or 242) may be coupled to one or any number of antennas 752. Thus, in FIG. 7, constant amplitude decomposed RF signal 130 (or 230) is provided to each of antennas 750 in phased array antenna panel 700, and constant amplitude decomposed RF signal 132 (or 232) is provided to each of antennas 752 in phased array antenna panel 700.

As illustrated in FIG. 7, phased array antenna panel 700 includes interleaved antenna rows 758a, 758b, 758c, 758d, 758e, 758f, 758g, 758h, 758i, 758j, 758k, and 758l, collectively referred to as interleaved antenna rows 758. Interleaved antenna rows 758a, 758c, 758e, 758g, 758i, and 758k include antennas 750 uniquely associated with power amplifiers that transmit constant amplitude decomposed RF signal 130 (or 230) (i.e., constant amplitude component S1(t) in equation (5) above). Interleaved antenna rows 758b, 758d, 758f, 758h, 758j, and 758l include antennas 752 uniquely associated with power amplifiers that transmit constant amplitude decomposed RF signal 132 (or 232) (i.e., constant amplitude component S2(t) in equation (5) above).

In the present implementation, each of antennas 750 in interleaved antenna rows 758a, 758c, 758e, 758g, 758i, and 758k is uniquely associated with power amplifier 140 (or 240), and is not associated with power amplifier 142 (or 242). Conversely, each of antennas 752 in interleaved antenna rows 758b, 758d, 758f, 758h, 758j, and 758l is uniquely associated with power amplifier 142 (or 242), and is not associated with power amplifier 140 (or 240). In one implementation, antennas 750 in interleaved antenna rows 758a, 758c, 758e, 758g, 758i, and 758k may be uniquely associated with more than one power amplifier 140 (or 240), while not being associated with any power amplifier 142 (or 242). In one implementation, antennas 752 in interleaved antenna rows 758b, 758d, 758f, 758h, 758j, and 758l may be uniquely associated with more than one power amplifier 142 (or 242), while not being associated with any power amplifier 140 (or 240). As used herein, the term "interleaved antenna rows" refers to the fact that an antenna row and its adjacent antenna row are uniquely associated with power amplifiers that transmit different constant amplitude decomposed RF signals that correspond to constant amplitude component S1(t) or constant amplitude component S2(t) in equation (5) above, respectively. For example, antenna row 758a is uniquely associated with power amplifiers that transmit constant amplitude decomposed RF signal 130 (or 230) (i.e., constant amplitude component S1(t) in equation (5) above), while adjacent antenna row 758b is uniquely associated with power amplifiers that transmit constant amplitude decomposed RF signal 132 (or 232) (i.e., constant amplitude component S2(t) in equation (5) above). In the present implementation, interleaved antenna rows 758 are interleaved along the direction of y-axis 764. In various implementations, interleaved antenna rows 758 may be interleaved along the direction of x-axis 762, or any other direction.

By utilizing a plurality of interleaved antenna rows 758 to alternate assignment of constant amplitude decomposed RF signals 130 and 132 (or 230 and 232), phased array antenna panel 700 significantly decreases EVM over a wide range of RF beam angles. The various implementations and advantages of power efficiency, improvement in non-linearity and performance, and decreased EVM discussed in relation to phased array antenna panel 400 in FIG. 4 may also apply to phased array antenna panel 700 in FIG. 7.

Figure 8:
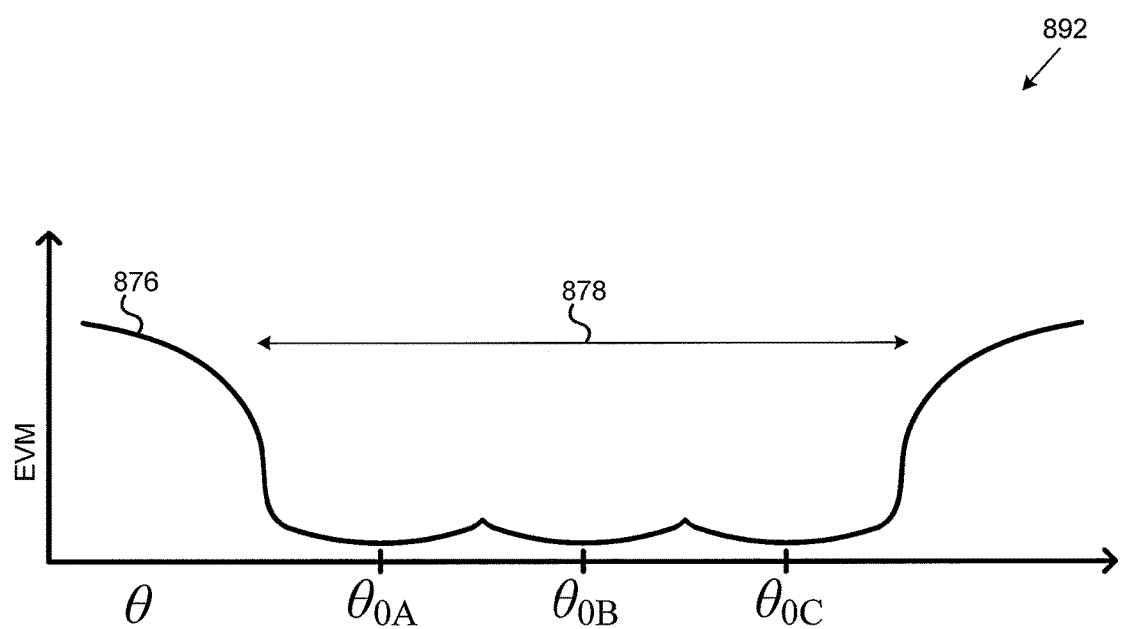
FIG. 8 illustrates a portion of an exemplary error vector magnitude (EVM) graph according to one implementation of the present application.

FIG. 8 illustrates a portion of an exemplary error vector magnitude (EVM) graph according to one implementation of the present application. As illustrated in FIG. 8, EVM graph 892 includes trace 876. Trace 876 represents the EVM for a phased array antenna panel, such as phased array antenna panel 700 in FIG. 7, versus RF beam angle $\theta$. Relative dimensions of the EVM and RF beam angle $\theta$ shown in FIG. 8 may be exaggerated for the purposes of illustration. Accordingly, units and scales are omitted in FIG. 8.

As shown by trace 876 in FIG. 8, the EVM decreases to minima around $\theta_{OA}$, $\theta_{OB}$, and $\theta_{OC}$. A decreased EVM generally correlates to a higher quality transmitter. Thus, $\theta_{OA}$, $\theta_{OB}$, and $\theta_{OC}$ may represent intended RF beam angles. In one implementation, the EVM may decrease to more or fewer minima than shown in FIG. 8 and the transmitter may have more or fewer intended RF beam angles. An EVM below a certain threshold may be desirable for the transmitter design. Bandwidth 878 represents a range of RF beam angle $\theta$ for which the EVM is below a design threshold. As illustrated in FIG. 8, bandwidth 878, corresponding to the interleaved antenna rows configuration of phased array antenna panel 700 in FIG. 7, is significantly wider than bandwidths 678a, 678b, and 678c, corresponding to the non-overlapping sub-arrays configuration of phased array antenna panel 400 in FIG. 4. In practice, a wider bandwidth, such as bandwidth 878, extends the scan range of a transmitter.

Figure 9A:
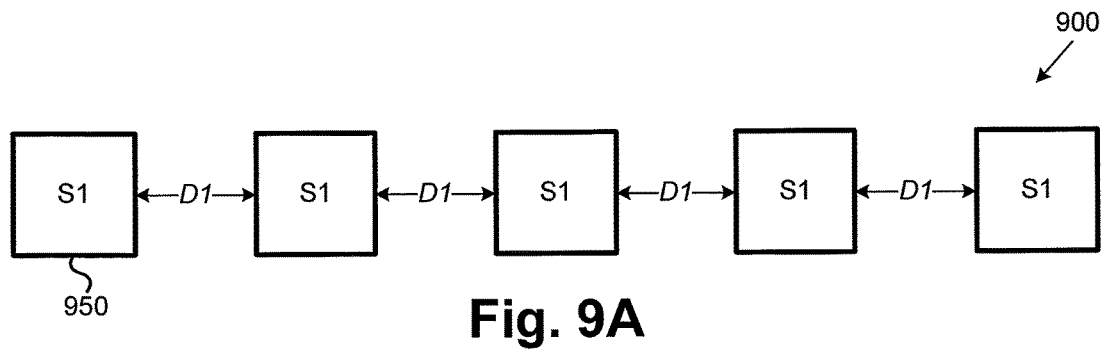
FIGS. 9A and 9B illustrate layout diagrams of a portion of an exemplary phased array antenna panel according to one implementation of the present application.

FIG. 9A illustrates a layout diagram of a portion of an exemplary phased array antenna panel according to one implementation of the present application. Phased array antenna panel 900 in FIG. 9A may generally correspond to a portion of phased array antenna panel 400 in FIG. 4. As illustrated in FIG. 9A, phased array antenna panel 900 includes a plurality of antennas 950. Each antenna 950 is uniquely associated with power amplifiers that transmit constant amplitude decomposed RF signal 130 (or 230) (i.e., constant amplitude component S1(t) in equation (5) above). In one implementation, for a wireless transmitter transmitting signals at 10 GHz (i.e., $\lambda$=30 mm), each antenna 950 may need an area of at least a quarter wavelength (i.e., $\lambda/4$=7.5 mm) by a quarter wavelength (i.e., $\lambda/4$=7.5 mm). Antennas 950 may each have a square shape having dimensions of 7.5 mm by 7.5 mm, for example. Antennas 950 may be, for example, cavity antennas or patch antennas or other types of antennas. The shape of antennas 950 may correspond to, for example, the shape of an opening in a cavity antenna or the shape of an antenna plate in a patch antenna. In other implementations, antennas 950 may have substantially circular shapes, or may have any other shapes.

As illustrated in FIG. 9A, each antenna element is uniformly spaced from each adjacent antenna element. In the present implementation, distance D1 uniformly separates various adjacent antennas elements. Notably, distance D1 in FIG. 9A also represents the distance between each antenna 950 that transmits constant amplitude component S1(t). In one implementation, distance D1 may be a quarter wavelength (i.e., $\lambda/4$). In various implementations, distance D1 may be less than or greater than a quarter wavelength (i.e., less than or greater than $\lambda/4$).

Figure 9B:
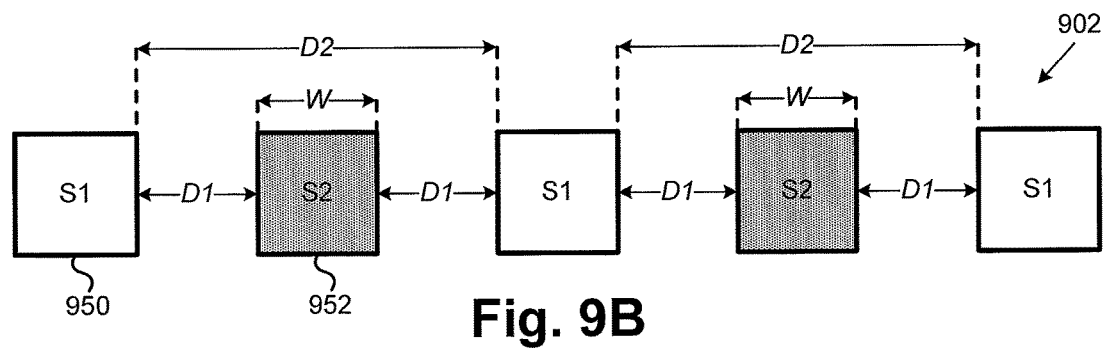

FIG. 9B illustrates a layout diagram of a portion of an exemplary phased array antenna panel according to one implementation of the present application. Phased array antenna panel 902 in FIG. 9B may generally correspond to a portion of phased array antenna panel 700 in FIG. 7. As illustrated in FIG. 9B, phased array antenna panel 902 includes a plurality of antennas 950 interleaved with a plurality of antennas 952. Each antenna 950 is uniquely associated with power amplifiers that transmit constant amplitude decomposed RF signal 130 (or 230) (i.e., constant amplitude component S1(t) in equation (5) above). Each antenna 952 is uniquely associated with power amplifiers that transmit constant amplitude decomposed RF signal 132 (or 232) (i.e., constant amplitude component S2(t) in equation (5) above). In one implementation, for a wireless transmitter transmitting signals at 10 GHz (i.e., $\lambda$=30 mm), each antenna 950 and 952 may need an area of at least a quarter wavelength (i.e., $\lambda/4$=7.5 mm) by a quarter wavelength (i.e., $\lambda/4$=7.5 mm). Antennas 950 and 952 may each have a square shape having dimensions of 7.5 mm by 7.5 mm, for example. Antennas 950 and 952 may be, for example, cavity antennas or patch antennas or other types of antennas. The shape of antennas 950 and 952 may correspond to, for example, the shape of an opening in a cavity antenna or the shape of an antenna plate in a patch antenna. In other implementations, antennas 950 and 952 may have substantially circular shapes, or may have any other shapes.

As illustrated in FIG. 9B, each antenna element is uniformly spaced from each adjacent antenna element. In the present implementation, distance D1 uniformly separates various adjacent antennas elements. Notably, in contrast to FIG. 9A, distance D1 in FIG. 9B does not represent the distance between each antenna 950 that transmits constant amplitude component S1(t). Rather, distance D2 uniformly separates each antenna 950. In the present implementation, distance D2 is defined by equation (6) below:

$$D2=2*D1+W \qquad \text{Equation (6)}$$

where W represents the width of each antenna 952. In one implementation, distance D1 may be a quarter wavelength (i.e., $\lambda/4$). In various implementations, distance D1 may be less than or greater than a quarter wavelength (i.e., less than or greater than $\lambda/4$). In one implementation, width W may be a quarter wavelength (i.e., $\lambda/4$). In various implementations, width W may be less than or greater than a quarter wavelength (i.e., less than or greater than $\lambda/4$). In one implementation, distance D2 may be three quarter wavelengths (i.e., $3\lambda/4$). In various implementations, distance D2 may be less than or greater than three quarter wavelengths (i.e., less than or greater than $3\lambda/4$).

As illustrated in FIGS. 9A and 9B, when antennas 950 are interleaved with antennas 952, as in the interleaved antenna rows configuration of phased array antenna panel 700 in FIG. 7, if each antenna element is uniformly spaced from its adjacent antenna element by distance D1, the distance between each antenna 950 increases as compared to when antennas 950 are not interleaved with antennas 952, as in the non-overlapping sub-arrays configuration of phased array antenna panel 400 in FIG. 4. In practice, a relatively large distance between antennas 950 uniquely associated with power amplifiers that transmit constant amplitude component S1(t), such as distance D2, can cause a phased array antenna panel to transmit RF beams in unintended directions, also referred to as "grating lobes." For example, phased array antenna panel 902 may exhibit grating lobes when distance D2 is greater than a half wavelength (i.e., greater than $\lambda/2$). In high frequency applications having short wavelengths, it can be complex and costly to manufacture phased array antenna panel 902 such that distance D2 is less than or equal to a half wavelength (i.e., less than or equal to $\lambda/2$).

Figure 9C:
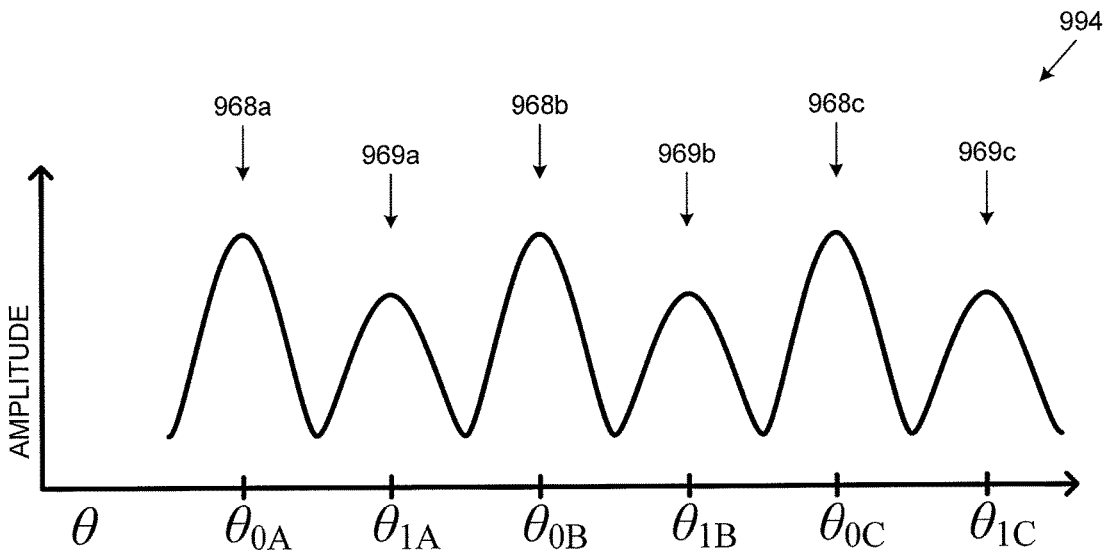
FIG. 9C illustrates a portion of an exemplary radiation pattern according to one implementation of the present application.

FIG. 9C illustrates a portion of an exemplary radiation pattern according to one implementation of the present application. As illustrated in FIG. 9C, radiation pattern 994 represents the amplitude versus angle θ of signals transmitted from a phased array antenna panel, such as phased array antenna panel 902 in FIG. 9B. Relative dimensions of the amplitude and angle θ shown in FIG. 9C may be exaggerated for the purposes of illustration. Accordingly, units and scales are omitted in FIG. 9C.

As shown in FIG. 9C, radiation pattern 994 includes intended RF beams 968a, 968b, and 968c, as indicated by the amplitude increasing to maxima around intended RF beam angles $\theta_{OA}$, $\theta_{OB}$, and $\theta_{OC}$. As further shown in FIG. 9C, radiation pattern 994 includes grating lobes 969a, 969b, and 969c, as indicated by the amplitude increasing to other maxima around grating lobe angles $\theta_{1A}$, $\theta_{1B}$, and $\theta_{1C}$. As stated above, a relatively large uniform spacing between antennas uniquely associated with power amplifiers that transmit a constant amplitude component, such as distance D2 in FIG. 9B, can cause undesirable grating lobes 969a, 969b, and 969c. In some implementations, the radiation pattern of the transmitter may have more or fewer intended RF beams and/or more or fewer undesirable grating lobes than shown in FIG. 9C. In practice, grating lobes interfere with proper reception of intended RF beams.

Figure 10A:
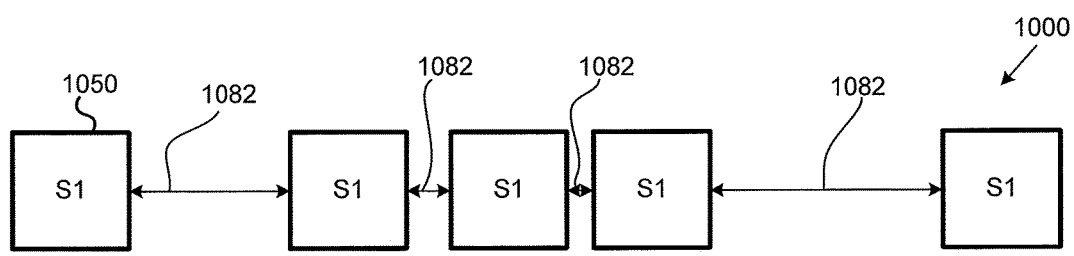
FIG. 10A illustrates a layout diagram of a portion of an exemplary phased array antenna panel according to one implementation of the present application.

FIG. 10A illustrates a layout diagram of a portion of an exemplary phased array antenna panel according to one implementation of the present application. As illustrated in FIG. 10A, phased array antenna panel 1000 includes a plurality of non-uniformly spaced antennas 1050. In the present implementation, each antenna 1050 is spaced from its adjacent antennas by a different distance. As stated above, manufacturing constraints make it difficult to manufacture a phased array antenna panel with small antenna spacing, and large uniform antenna spacing can produce grating lobes. One solution is to use non-uniform antenna spacing, such as in phased array antenna panel 1000. Non-uniform antenna spacings 1082 reduce grating lobes, as discussed further below. The dimensions of each antenna 1050 compared to the dimensions of non-uniform antenna spacings 1082 may be exaggerated for the purposes of illustration. The various implementations and examples of transmission frequencies, antenna sizes, antenna shapes, antenna types, and uniquely associated power amplifiers discussed in relation to antennas 950 in FIG. 9A may also apply to non-uniformly spaced antennas 1050 shown in FIG. 10A.

Figure 10B:
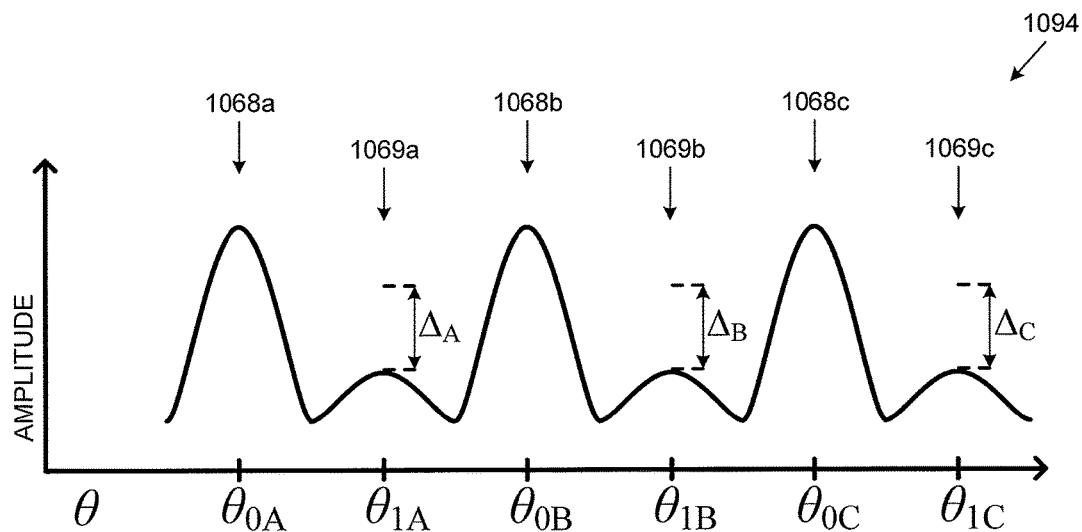
FIG. 10B illustrates a portion of an exemplary radiation pattern according to one implementation of the present application.

FIG. 10B illustrates a portion of an exemplary radiation pattern according to one implementation of the present application. As illustrated in FIG. 10B, radiation pattern 1094 represents the amplitude versus angle θ of signals transmitted from a phased array antenna panel, such as phased array antenna panel 1000 in FIG. 10A. Relative dimensions of the amplitude and angle θ shown in FIG. 10B may be exaggerated for the purposes of illustration. Accordingly, units and scales are omitted in FIG. 10B.

As shown in FIG. 10B, radiation pattern 1094 includes intended RF beams 1068a, 1068b, and 1068c, as indicated by the amplitude increasing to maxima around intended RF beam angles $\theta_{0A}$, $\theta_{0B}$, and $\theta_{0C}$. As further shown in FIG. 10B, radiation pattern 1094 includes grating lobes 1069a, 1069b, and 1069c, as indicated by the amplitude increasing to other maxima around grating lobe angles $\theta_{1A}$, $\theta_{1B}$, and $\theta_{1C}$. As stated above, non-uniformly spaced antennas can reduce undesirable grating lobes 1069a, 1069b, and 1069c. As illustrated in FIG. 10B, grating lobes 1069a, 1069b, and 1069c, corresponding to the non-uniformly spaced antennas configuration of phased array antenna panel 1000 in FIG. 10A, are significantly reduced by $\Delta_A$, $\Delta_B$, and $\Delta_c$ respectively as compared to grating lobes 969a, 969b, and 969c in FIG. 9C, corresponding to the uniformly spaced antennas configuration of phased array antenna panel 902 in FIG. 9B. In practice, reducing grating lobes reduces interference with proper reception of intended RF beams. However, it can be complex and costly to manufacture phased array antenna panel 1000 due to the unique dimensions of non-uniform antenna spacings 1082 in non-uniformly spaced antennas 1050. Additionally, non-uniformly spaced antennas 1050 do not readily accommodate an interleaving antenna configuration, such as the interleaving configuration of antennas 750 and antennas 752 in FIG. 7, since such interleaving configuration requires a relatively uniform spacing of antennas 750 and antennas 752.

Figure 11A:
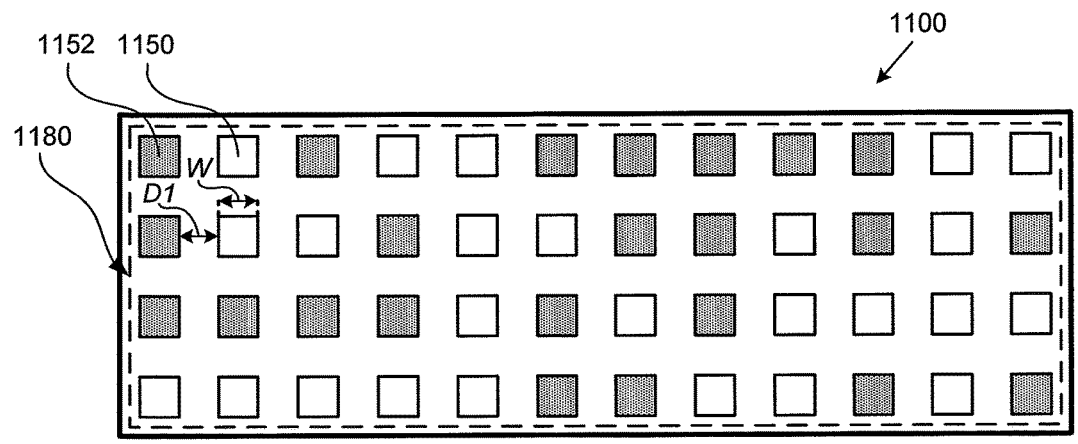
FIGS. 11A, 11B, and 11C illustrate layout diagrams of a portion of an exemplary phased array antenna panel according to one implementation of the present application.

FIG. 11A illustrates a layout diagram of a portion of an exemplary phased array antenna panel according to one implementation of the present application. As illustrated in FIG. 11A, phased array antenna panel 1100 shows random assignment 1180 of antennas 1150 (unshaded in the drawings) and antennas 1152 (shaded in the drawings). In the present implementation, antennas 1150 may be hard-wired to power amplifiers that transmit constant amplitude decomposed RF signal 130 (or 230) (i.e., constant amplitude component S1(t) in equation (5) above). Antennas 1152 may be hard-wired to power amplifiers that transmit constant amplitude decomposed RF signal 132 (or 232) (i.e., constant amplitude component S2(t) in equation (5) above). The hard-wired random assignment of antennas in phased array antenna panel 1100 results in a random configuration of antennas that are hard-wired to transmit constant amplitude component S1(t) and another random configuration of antennas that are hard-wired to transmit constant amplitude component S2(t). Such random assignment is predetermined, prior to manufacturing phased array antenna panel 1100, by any method known in the art, such as using various random number generation algorithms.

In the implementation shown in FIG. 11A, each antenna element is uniformly spaced from each adjacent antenna element, and each antenna element has a uniform width. In the present implementation, distance D1 uniformly separates various adjacent antennas elements having uniform width W. The various implementations and examples of antenna shapes, sizes, numbers, types, and beamforming, and power amplifier couplings discussed in relation to phased array antenna panel 400 in FIG. 4 may also apply to phased array antenna panel 1100 shown in FIG. 11A.

Figure 11B:
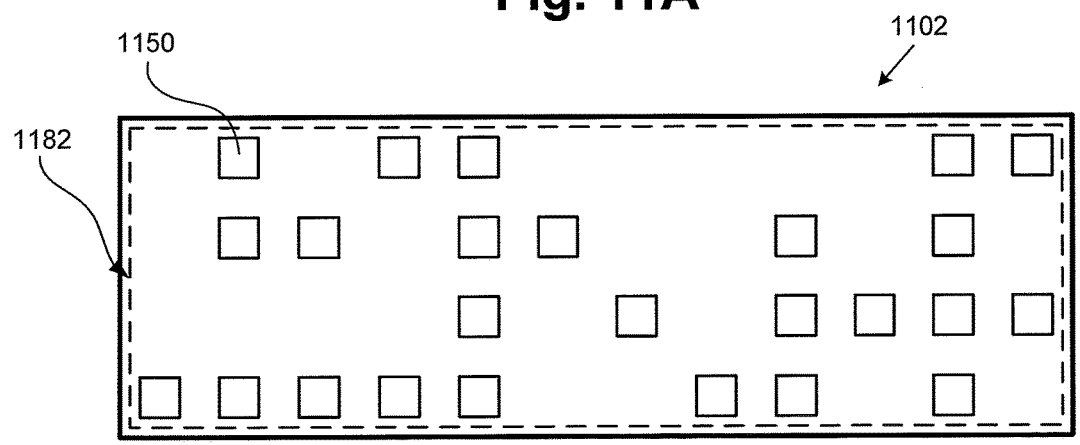

FIG. 11B illustrates a layout diagram of a portion of an exemplary phased array antenna panel according to one implementation of the present application. Phased array antenna panel 1102 in FIG. 11B corresponds to phased array antenna panel 1100 in FIG. 11A. As illustrated in FIG. 11B, phased array antenna panel 1102 shows random assignment 1182 of antennas 1150. Phased array antenna panel 1102 in FIG. 11B shows the portion of phased array antenna panel 1100 in FIG. 11A that is hard-wired to transmit constant amplitude component S1 (t). As illustrated in FIG. 11B, antennas 1150 in random assignment 1182 are non-uniformly spaced relative to each other.

Figure 11C:
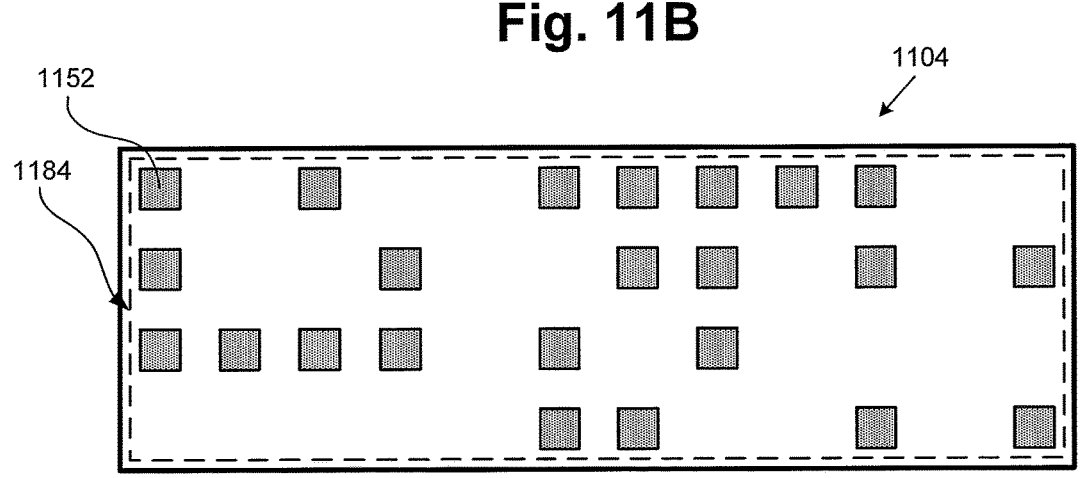

FIG. 11C illustrates a layout diagram of a portion of an exemplary phased array antenna panel according to one implementation of the present application. Phased array antenna panel 1104 in FIG. 11C corresponds to phased array antenna panel 1100 in FIG. 11A. As illustrated in FIG. 11C, phased array antenna panel 1104 shows random assignment 1184 of antennas 1152. Thus, phased array antenna panel 1104 in FIG. 11C shows the portion of phased array antenna panel 1100 in FIG. 11A that is hard-wired to transmit constant amplitude component S2(t). As illustrated in FIG. 11C, antennas 1152 in random assignment 1184 are non-uniformly spaced relative to each other.

By utilizing random assignment 1180, phased array antenna panel 1100 exhibits non-uniform antenna spacing for antennas 1150 that transmit constant amplitude decomposed RF signal 130 (or 230) and for antennas 1152 that transmit constant amplitude decomposed RF signal 132 (or 232). Thus, phased array antenna panel 1100 effectively reduces grating lobes in applications that employ constant amplitude decomposed signals. In addition, by using the same distance D1 that uniformly separates various adjacent antennas elements having uniform width W, phased array antenna panel 1100 can be more easily manufactured.

Figure 12A:
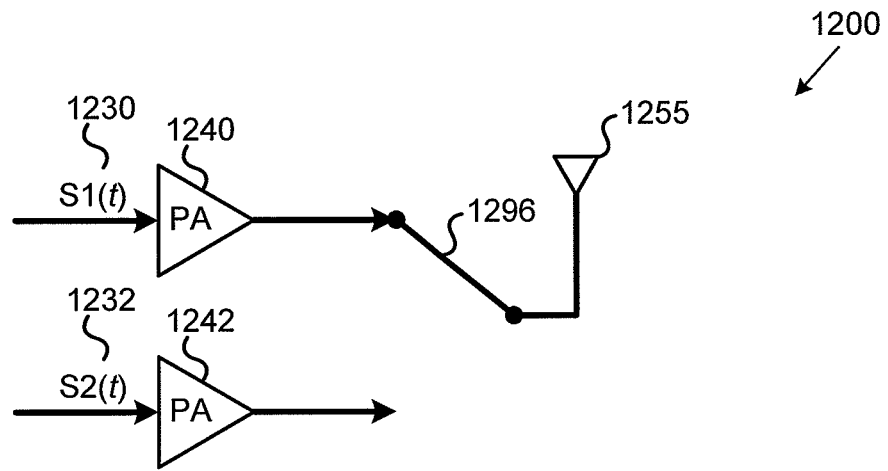
FIGS. 12A and 12B illustrate exemplary diagrams of a portion of an exemplary outphasing transmitter according to one implementation of the present application.
Figure 12B:
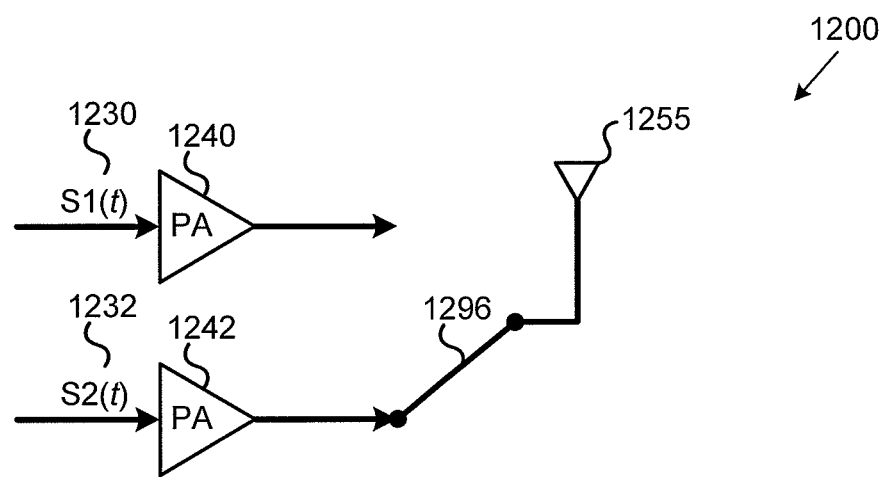

FIGS. 12A and 12B illustrate exemplary diagrams of a portion of an exemplary outphasing transmitter according to one implementation of the present application. As illustrated in FIGS. 12A and 12B, outphasing transmitter 1200 includes power amplifiers 1240 and 1242, switch 1296, and antenna 1255. Antenna 1255 is configured to be dynamically and selectably assigned to power amplifier 1240 or 1242. In one implementation, antenna 1255 may be dynamically and selectably assigned based on control signals received from a master chip (not shown in FIGS. 12A and 12B). As shown in FIG. 12A, switch 1296 can assign power amplifier 1240 to antenna 1255. As shown in FIG. 12B, switch 1296 can also assign power amplifier 1242 to antenna 1255. Thus, antenna 1255 in outphasing transmitter 1200 can transmit either constant amplitude decomposed RF signal 1230 or 1232 (i.e., either constant amplitude component S1(t) or constant amplitude component S2(t)).

In the present implementation, switch 1296 is coupled between power amplifiers 1240 and 1242 and antenna 1255. In one implementation, switch 1296 may be coupled between a decomposition block (not shown in FIGS. 12A and 12B) and a power amplifier. Switch 1296 may be, for example, an RF switch or an RF multiplexer. Antenna 1255 may be part of a phased array antenna panel. In one implementation, a single switch 1296 assigns a single antenna 1255 in a phased array antenna panel. In various implementations, a single switch 1296 may assign four, six, eight, sixteen, or any number of antennas 1255 in a phased array antenna panel.

Figure 13A:
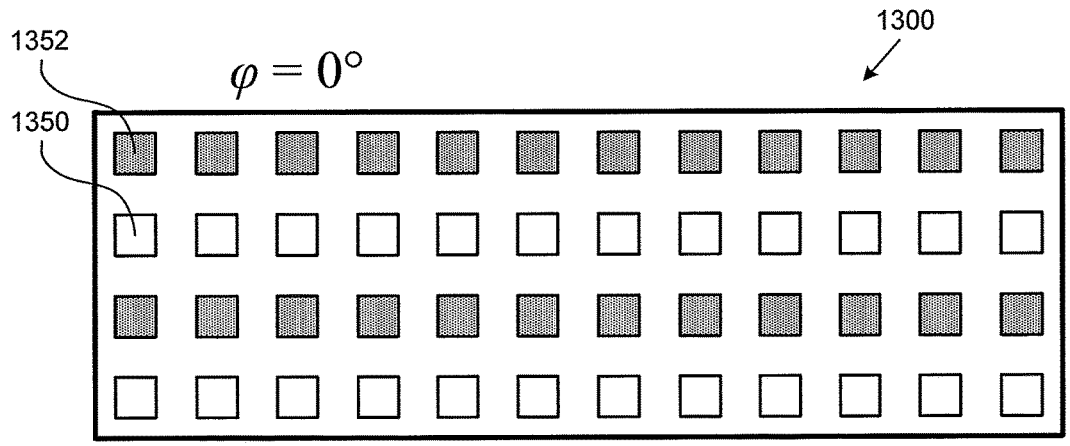
FIGS. 13A, 13B, and 13C illustrate layout diagrams of a portion of an exemplary phased array antenna panel according to one implementation of the present application.
Figure 13B:
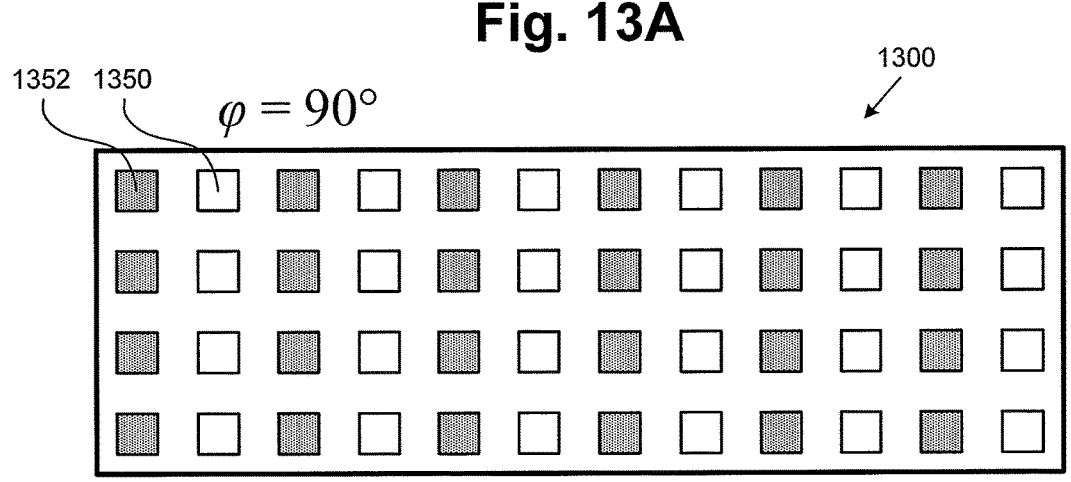
Figure 13C:
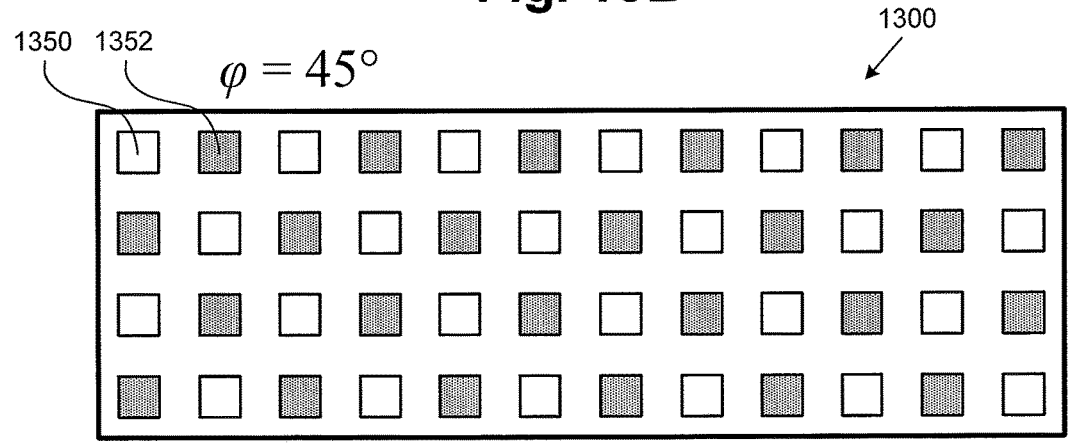

FIGS. 13A, 13B, and 13C illustrate layout diagrams of a portion of an exemplary phased array antenna panel according to one implementation of the present application. As illustrated in FIGS. 13A, 13B, and 13C, phased array antenna panel 1300 includes antennas 1350 (unshaded in the drawings) and antennas 1352 (shaded in the drawings). Each of antennas 1350 in FIGS. 13A, 13B, and 13C may generally correspond to antenna 1255 in FIG. 12A dynamically and selectably assigned to power amplifiers that transmit constant amplitude decomposed RF signal 1230 (i.e., constant amplitude component S1($t$)). Each of antennas 1352 in FIGS. 13A, 13B, and 13C may generally correspond to antenna 1255 in FIG. 12B dynamically and selectably assigned to power amplifiers that transmit constant amplitude decomposed RF signal 1232 (i.e., constant amplitude component S2($t$)). The various implementations and examples of antenna shapes, sizes, distances, numbers, types, and beamforming, and power amplifier couplings discussed in relation to phased array antenna panel 400 in FIG. 4 may also apply to phased array antenna panel 1300 shown in FIGS. 13A, 13B, and 13C.

In the implementation shown in FIGS. 13A, 13B, and 13C, phased array antenna panel 1300 can form RF beams and change the directions of the RF beams. Phased array antenna panel 1300 can dynamically and selectably assign antennas 1350 and 1352 based on the desired direction of the RF beams to be formed. As illustrated in FIG. 13A, when transmitting an RF beam having angle $\varphi=0°$, the outphasing transmitter, such as outphasing transmitter 1200, dynamically and selectably assigns antennas 1350 and 1352 in horizontal rows. As illustrated in FIG. 13B, when transmitting an RF beam having angle $\varphi=90°$, the outphasing transmitter, such as outphasing transmitter 1200, dynamically and selectably assigns antennas 1350 and 1352 in vertical rows. As illustrated in FIG. 13C, when transmitting an RF beam having angle $\varphi=45°$, the outphasing transmitter, such as outphasing transmitter 1200, dynamically and selectably assigns antennas 1350 and 1352 in diagonal rows. By dynamically assigning antennas 1350 and 1352 based on RF beam angle $\varphi$ as shown in FIGS. 13A, 13B, and 13C, phased array antenna panel 1300 can decrease EVM while also minimizing grating lobes. In various implementations, the outphasing transmitter may dynamically assign antennas 1350 and 1352 differently for $\varphi=0°$, $\varphi=90°$, and $\varphi=45°$, in patterns other than rows, and/or based on factors other than or in addition to RF beam angle $\varphi$.

FIG. 14 illustrates an exemplary lookup table according to one implementation of the present application. Lookup table 1400 shows exemplary antenna assignments for a phased array antenna panel. An outphasing transmitter, such as outphasing transmitter 1200, references lookup table 1400 to dynamically and selectably assign antennas in the phased array antenna panel to either the constant amplitude component S1($t$) (represented simply by S1 in lookup table 1400) or the constant amplitude component S2($t$) (represented simply by S2 in lookup table 1400). In the present implementation, antenna assignments in lookup table 1400 are referenced based on the desired direction of an RF beam to be formed. For example, when transmitting an RF beam in direction of ($\theta_i$, $\varphi_1$), the outphasing transmitter references $\theta_i$ in the $\theta$ index of lookup table 1400, references $\varphi_1$ in the $\varphi$ index, and retrieves the antenna assignment values corresponding to ($\theta_i$, $\varphi_1$) in lookup table 1400. For the purpose of an example only, antenna assignment values corresponding to an RF beam formed in the direction of ($\theta_i$, $\varphi_1$) are shown by the corresponding row in lookup table 1400 by table entries S1, S1, S2, S2, S2, . . . S1. As another example, antenna assignment values corresponding to an RF beam formed in the direction of ($\theta_i$, $\varphi_m$) are shown by the corresponding row in lookup table 1400 by table entries S1, S1, S1, S2, S2, . . . S2. As yet another example, antenna assignment values corresponding to an RF beam formed in the direction of ($\theta_k$, $\varphi_n$) are shown by the corresponding row in lookup table 1400 by table entries S2, S2, S1, S1, S1, . . . S2.

The outphasing transmitter uses the antenna assignment values to dynamically assign antennas to S1($t$) or S2($t$). For example, the outphasing transmitter can use the antenna assignment values to generate control signals for switches, such as switches 1296, to dynamically assign antennas to S1($t$) or S2($t$). In the present implementation, each antenna assignment in lookup table lookup table 1400 represents the antenna assignment that yields the minimum grating lobe for the corresponding RF beam direction. Such assignments are predetermined based on simulations, or tests and measurements performed prior to mass manufacturing of the outphasing transmitter by various methods known in the art, such as simulation using high frequency structure simulator (HFSS) software, or laboratory testing of sample prototypes of the phased array antenna panels.

In one implementation, lookup table 1400 may be stored in a master chip (not shown in FIG. 14), in its processor or in its memory, such as read-only memory (ROM) or random-access memory (RAM). When stored in a master chip, lookup table 1400 may contain assignments for all antennas in the phased array antenna panel. In one implementation, lookup table 1400 may be stored in an RF front end chip (not shown in FIG. 14), in its processor or in its memory, such as ROM or RAM. In one implementation, the RF front end chip may be the same RF front end chip that includes decomposition block 120 (or 220), power amplifiers 140 and 142 (or 240 and 242), and other components of outphasing transmitter 100 (or 200) in FIG. 1 (or FIG. 2). When stored in an RF front end chip, lookup table 1400 may contain assignments for antennas associated with the RF front end chip. In one implementation, each antenna assignment in lookup table 1400 may represent an antenna assignment that optimizes factors other than or in addition to grating lobe. In one implementation, the outphasing transmitter may reference antenna assignments in lookup table 1400 based on the desired directions of multiple RF beams to be formed. In one implementation, the outphasing transmitter may reference antenna assignments in lookup table 1400 based on factors other than or in addition to the desired RF beam direction. By referencing lookup table 1400, outphasing transmitter 1200 greatly simplifies dynamically and selectably assigning antennas in a phased array antenna panel.

Figure 15A:
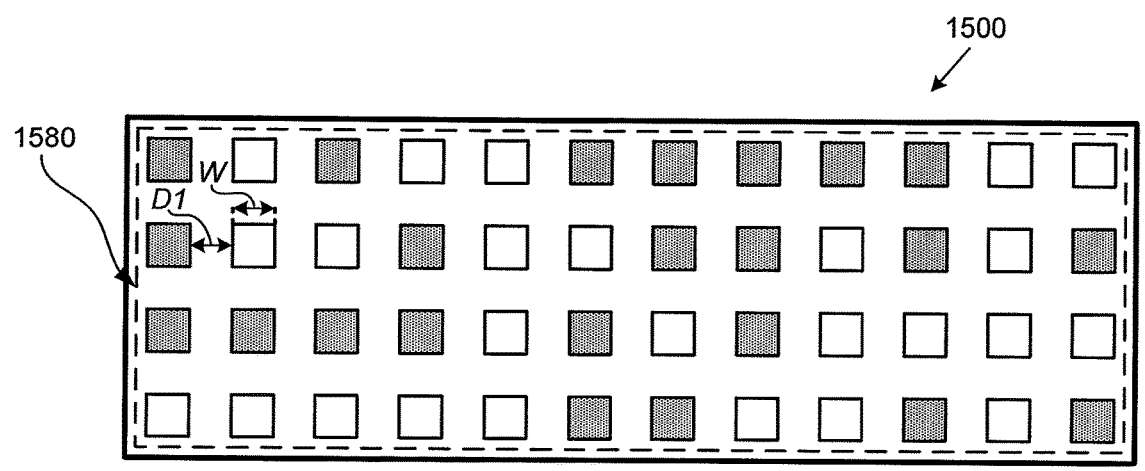
FIGS. 15A, 15B, and 15C illustrate layout diagrams of a portion of an exemplary phased array antenna panel according to one implementation of the present application.
Figure 15B:
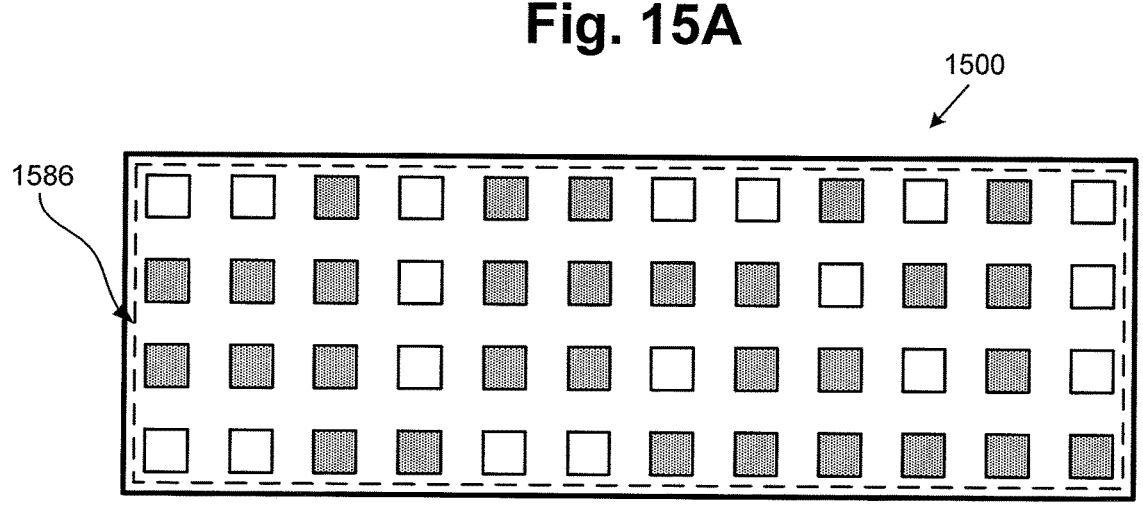
Figure 15C:
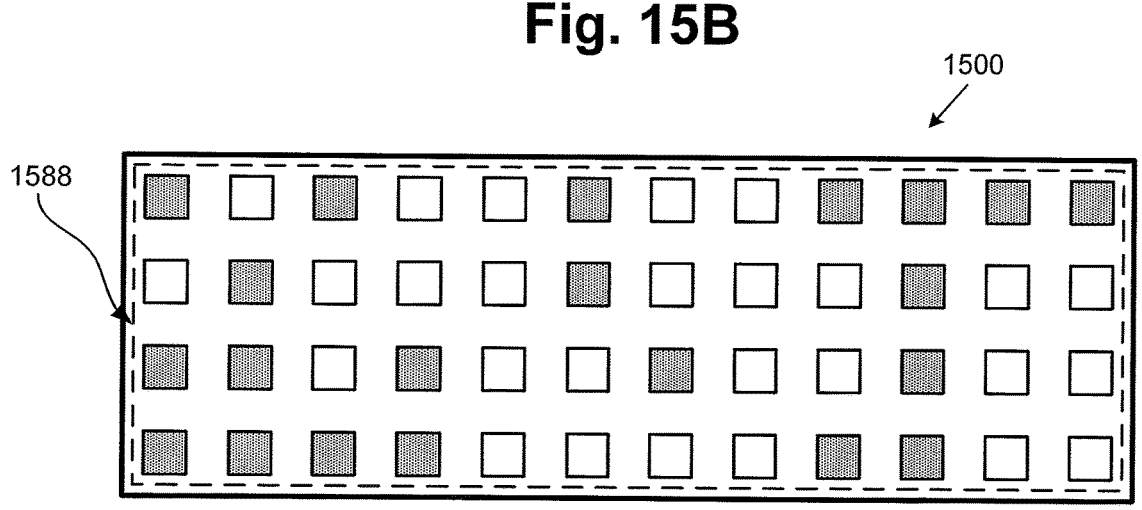

FIGS. 15A, 15B, and 15C illustrate layout diagrams of a portion of an exemplary phased array antenna panel according to one implementation of the present application. As illustrated in FIGS. 15A, 15B, and 15C, phased array antenna panel 1500 shows random assignments 1580, 1586, and 1588 of antennas. Each antenna 1550 (unshaded in the drawings) may generally correspond to antenna 1255 in FIG. 12A dynamically and selectably assigned to power amplifiers that transmit constant amplitude decomposed RF signal 1230 (i.e., constant amplitude component S1 ($t$)). Each antenna 1552 (shaded in the drawings) may generally correspond to antenna 1255 in FIG. 12B dynamically and selectably assigned to power amplifiers that transmit constant amplitude decomposed RF signal 1232 (i.e., constant amplitude component S2(t)). In the implementation shown in FIGS. 15A, 15B, and 15C, each antenna element is uniformly spaced from each adjacent antenna element, and each antenna element has a uniform width. In the present implementation, distance D1 uniformly separates various adjacent antennas elements having uniform width W. The various implementations and examples of antenna shapes, sizes, distances, numbers, types, and beamforming, and power amplifier couplings discussed in relation to phased array antenna panel 400 in FIG. 4 may also apply to phased array antenna panel 1500 shown in FIGS. 15A, 15B, and 15C.

As illustrated in FIGS. 15A, 15B, and 15C, the outphasing transmitter, such as outphasing transmitter 1200, dynamically and selectably assigns antennas in random assignment 1580 (FIG. 15A), random assignment 1586 (FIG. 15B), and random assignment 1588 (FIG. 15C). The outphasing transmitter can dynamically and selectably assign antennas in numerous other random assignments, only examples of which are shown in FIGS. 15A, 15B, and 15C. In one implementation, such random assignments may be made by a processor of a master chip (not shown in FIGS. 15A, 15B, and 15C), by any method known in the art, such as using various random number generation algorithms. In one implementation, the outphasing transmitter can dynamically and selectably assign antennas in various random assignments in conjunction with a change in the direction of an RF beam to be formed by phased array antenna panel 1500.

By dynamically assigning antennas in random assignments 1580, 1586, and 1588, phased array antenna panel 1500 effectively results in non-uniform antenna spacing for antennas that transmit constant amplitude decomposed RF signal 1230 and for antennas that transmit constant amplitude decomposed RF signal 1232. Thus, phased array antenna panel 1500 effectively reduces grating lobes in applications that employ constant amplitude decomposed signals. In addition, by using the same distance D1 that uniformly separates various adjacent antennas elements having uniform width W, phased array antenna panel 1500 can be more easily manufactured.

Figure 16:
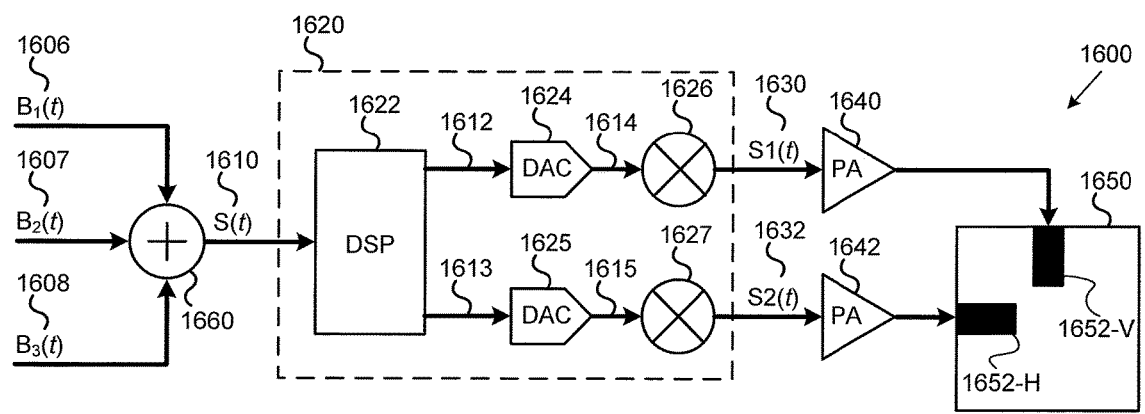
FIG. 16 illustrates an exemplary system diagram of a portion of an exemplary outphasing transmitter according to one implementation of the present application.

FIG. 16 illustrates an exemplary system diagram of a portion of an exemplary outphasing transmitter according to one implementation of the present application. As illustrated in FIG. 16, outphasing transmitter 1600 includes combiner 1660, decomposition block 1620, having DSP 1622, DACs 1624 and 1625, and mixers 1626 and 1627, power amplifiers 1640 and 1642, and dual-polarized antenna 1650, having vertically-polarized probe 1652-V and horizontally-polarized probe 1652-H.

As illustrated in FIG. 16, beamforming signals 1606, 1607, and 1608 are provided to combiner 1660. Beamforming signals 1606, 1607, and 1608 are generally amplitude and phase modulated signals. For example, beamforming signal 1606 may carry amplitude and phase information for an antenna in a phased array antenna panel to contribute to formation of a first RF beam. Similarly, beamforming signals 1607 and 1608 may carry amplitude and phase information for the antenna to contribute to formation of second and third RF beams respectively. Beamforming signals 1606, 1607, and 1608 may be provided by a radio frequency (RF) front end chip (not shown in FIG. 16) in a phased array antenna panel configured to provide amplitude and phase shifted signals in response to control signals received from a master chip in the phased array antenna panel (not shown in FIG. 16). An example of such phased array antenna panel, utilizing RF front end chips and a master chip is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. In one implementation, an RF front end chip may include components of outphasing transmitter 1600, such as combiner 1660, decomposition block 1620, and power amplifiers 1640 and 1642. In one implementation, a single RF front end chip may be associated with a single dual-polarized antenna 1650. In various implementations, a single RF front end chip may be associated with four, six, eight, sixteen, or any number of dual-polarized antennas 1650. Various examples of association of RF front end chips with different numbers and arrangements of antennas is described in U.S. patent application Ser. No. 15/255,656 filed on Sep. 2, 2016, and titled "Novel Antenna Arrangements and Routing Configurations in Large Scale Integration of Antennas with Front End Chips in a Wireless Receiver." The disclosure in this related application is hereby incorporated fully by reference into the present application.

In the present implementation, beamforming signals 1606, 1607, and 1608 are variable envelope signals defined by $B_1(t)$, $B_2(t)$, and $B_3(t)$ respectively in equations (1), (2), and (3) above. As shown in FIG. 16, combiner 1660 is configured to combine beamforming signals 1606, 1607, and 1608 into composite input signal 1610. In the present implementation, composite input signal 1610 is a variable envelope signal defined by S(t) in equation (4) above. In various implementations, combiner 1660 may combine more or fewer beamforming signals into composite input signal 1610. As shown in FIG. 16, decomposition block 1620 is configured to decompose variable amplitude (or variable envelope) composite input signal 1610 into constant amplitude (or constant envelope) decomposed RF signals 1630 and 1632. In decomposition block 1620, DSP 1622 decomposes variable amplitude composite input signal 1610 into constant amplitude decomposed digital signals 1612 and 1613. DSP 1622 may be implemented, for example, using a field-programmable gate array (FPGA) chip. DSP 1622 is coupled to DACs 1624 and 1625. DACs 1624 and 1625 convert the constant amplitude decomposed digital signals 1612 and 1613 into constant amplitude decomposed analog signals 1614 and 1615 respectively. DACs 1624 and 1625 are coupled to mixers 1626 and 1627 respectively. Mixers 1626 and 1627 upconvert constant amplitude decomposed analog signals 1614 and 1615 into constant amplitude decomposed RF signals 1630 and 1632. Decomposition block 1620 outputs constant amplitude decomposed RF signals 1630 and 1632. Decomposition block 1620 may include additional components, such as additional signal conditioning circuitry. In the present implementation, decomposed RF signals 1630 and 1632 are constant amplitude RF signals defined by respective constant amplitude components $S1(t)$ and $S2(t)$ in equation (5) above.

As illustrated in FIG. 16, decomposition block 1620 is coupled to power amplifiers 1640 and 1642. Power amplifiers 1640 and 1642 amplify constant amplitude decomposed RF signals 1630 and 1632 respectively. Power amplifiers 1640 and 1642 can be placed sufficiently apart from each other and provided respective RF shields so as to minimize any inter-modulation or interference between these two power amplifiers.

In the present implementation, power amplifiers 1640 and 1642 are coupled to dual-polarized antenna 1650 at vertically-polarized probe 1652-V and horizontally-polarized probe 1652-H respectively. Dual-polarized antenna 1650 may be, for example, a dual-polarized patch antenna, a dual-polarized dipole antenna, or a dual-polarized slot antenna. Dual-polarized antenna 1650 may transmit amplified constant amplitude decomposed RF signal 1630 using vertically-polarized probe 1652-V. Dual-polarized antenna 1650 may also transmit amplified constant amplitude decomposed RF signal 1632 using horizontally-polarized probe 1652-H. Dual-polarized antenna 1650 may be part of a phased array antenna panel (not shown in FIG. 16). In practice, for example when used in conjunction with 5G wireless communications (5th generation mobile networks or 5th generation wireless systems), a phased array antenna panel may have one hundred and forty four (144) dual-polarized antennas 1650. When used in conjunction with commercial geostationary communication satellites or low earth orbit satellites, a phased array antenna panel may be even larger, and have, for example, four hundred (400) dual-polarized antennas 1650. In other examples, a phased array antenna panel may have any other number of dual-polarized antennas 1650. In one implementation, a single power amplifier 1640 is coupled to a single vertically-polarized probe 1652-V. In various implementations, a single power amplifier 1640 may be coupled to four, six, eight, sixteen, or any number of vertically-polarized probes 1652-V. For example, power amplifier 1640 may be coupled to each of vertically-polarized probes 1652-V, using, for example, a splitter, a plurality of amplifier cells, or other suitable means. Likewise, a single power amplifier 1642 may be coupled to one or any number of horizontally-polarized probes 1652-H. Thus, vertically-polarized probe 1652-V may transmit amplified constant amplitude decomposed RF signal 1630, and horizontally-polarized probe 1652-H may transmit amplified constant amplitude decomposed RF signal 1632.

By decomposing variable amplitude composite input signal 1610 into constant amplitude decomposed RF signals 1630 and 1632 prior to their amplification, power amplifiers 1640 and 1642 operate with more power efficiency. Moreover, power amplifiers 1640 and 1642 exhibit less non-linearity and introduce less distortion than would a power amplifier utilized to amplify variable amplitude composite signal 1610 without decomposition. In addition, a combiner is not utilized to combine the outputs of power amplifiers 1640 and 1642, thus avoiding loss or inter-modulation between power amplifiers 1640 and 1642. Further, by utilizing dual-polarized antenna 1650, outphasing transmitter 1600 transmits two constant amplitude decomposed RF signals using a single antenna element 1650. Thus, outphasing transmitter 1600 efficiently transmits constant amplitude decomposed RF signal 1630 as a vertically-polarized signal using vertically-polarized probe 1652-V, and efficiently transmits constant amplitude decomposed RF signal 1632 as a horizontally-polarized signal using horizontally-polarized probe 1652-H.

Figure 17:
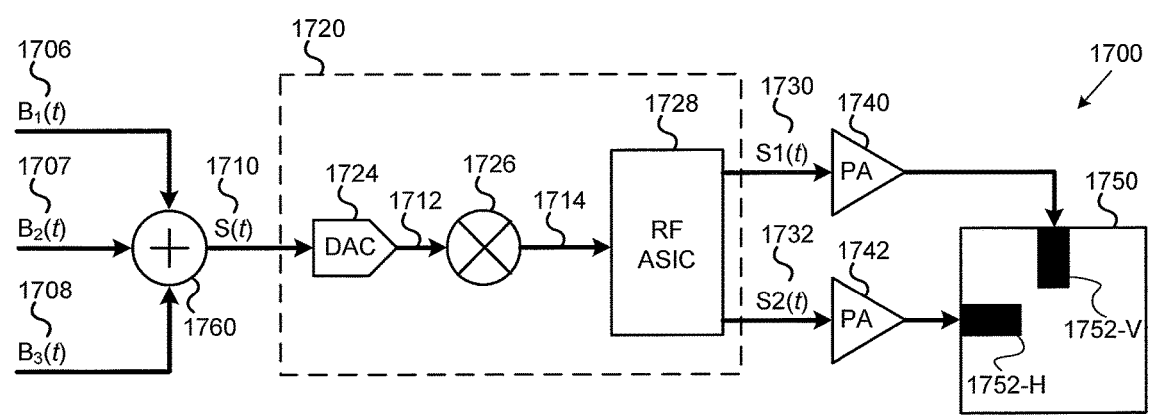
FIG. 17 illustrates an exemplary system diagram of a portion of an exemplary outphasing transmitter according to one implementation of the present application.

FIG. 17 illustrates an exemplary system diagram of a portion of an exemplary outphasing transmitter according to one implementation of the present application. As illustrated in FIG. 17, outphasing transmitter 1700 includes combiner 1760, decomposition block 1720, having DAC 1724, mixer 1726, and RF ASIC 1728, power amplifiers 1740 and 1742, and dual-polarized antenna 1750, having vertically-polarized probe 1752-V and horizontally-polarized probe 1752-H.

As illustrated in FIG. 17, beamforming signals 1706, 1707, and 1708 are provided to combiner 1760. Beamforming signals 1706, 1707, and 1708 are generally amplitude and phase modulated signals. For example, beamforming signal 1706 may carry amplitude and phase information for an antenna in a phased array antenna panel to contribute to formation of a first RF beam. Similarly, beamforming signals 1707 and 1708 may carry amplitude and phase information for the antenna to contribute to formation of second and third RF beams respectively. Beamforming signals 1706, 1707, and 1708 may be provided by a radio frequency (RF) front end chip (not shown in FIG. 17) in a phased array antenna panel configured to provide amplitude and phase shifted signals in response to control signals received from a master chip in the phased array antenna panel (not shown in FIG. 17). An example of such phased array antenna panel, utilizing RF front end chips and a master chip is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. In one implementation, an RF front end chip may include components of outphasing transmitter 1700, such as combiner 1760, decomposition block 1720, and power amplifiers 1740 and 1742. In one implementation, a single RF front end chip may be associated with a single dual-polarized antenna 1750. In various implementations, a single RF front end chip may be associated with four, six, eight, sixteen, or any number of dual-polarized antennas 1750. Various examples of association of RF front end chips with different numbers and arrangements of antennas is described in U.S. patent application Ser. No. 15/255,656 filed on Sep. 2, 2016, and titled "Novel Antenna Arrangements and Routing Configurations in Large Scale Integration of Antennas with Front End Chips in a Wireless Receiver." The disclosure in this related application is hereby incorporated fully by reference into the present application.

In the present implementation, beamforming signals 1706, 1707, and 1708 are variable envelope signals defined by $B_1(t)$, $B_2(t)$, and $B_3(t)$ respectively in equations (1), (2), and (3) above. As shown in FIG. 17, combiner 1760 is configured to combine beamforming signals 1706, 1707, and 1708 into composite input signal 1710. In the present implementation, composite input signal 1710 is a variable envelope signal defined by S(t) in equation (4) above. In various implementations, combiner 1760 may combine more or fewer beamforming signals into composite input signal 1710.

As shown in FIG. 17, decomposition block 1720 is configured to decompose variable amplitude (or variable envelope) composite input signal 1710 into constant amplitude (or constant envelope) decomposed RF signals 1730 and 1732. In decomposition block 1720, DAC 1724 converts variable amplitude composite input signal 1710 into variable amplitude analog signal 1712. DAC 1724 is coupled to mixer 1726. Mixer 1726 upconverts variable amplitude analog signal 1712 into variable amplitude RF signal 1714. Mixer 1726 is coupled to RF ASIC 1728. RF ASIC 1728 decomposes variable amplitude RF signal 1714 into constant amplitude decomposed RF signals 1730 and 1732. Decomposition block 1720 outputs constant amplitude decomposed RF signals 1730 and 1732. Decomposition block 1720 may include additional components, such as additional signal conditioning circuitry. In the present implementation, decomposed RF signals 1730 and 1732 are constant amplitude RF signals defined by respective constant amplitude components $S1(t)$ and $S2(t)$ in equation (5) above.

As illustrated in FIG. 17, decomposition block 1720 is coupled to power amplifiers 1740 and 1742. Power amplifiers 1740 and 1742 amplify constant amplitude decomposed RF signals 1730 and 1732 respectively. Power amplifiers 1740 and 1742 can be placed sufficiently apart from each other and provided respective RF shields so as to minimize any inter-modulation or interference between these two power amplifiers.

In the present implementation, power amplifiers 1740 and 1742 are coupled to dual-polarized antenna 1750 at vertically-polarized probe 1752-V and horizontally-polarized probe 1752-H respectively. Dual-polarized antenna 1750 may be, for example, a dual-polarized patch antenna, a dual-polarized dipole antenna, or a dual-polarized slot antenna. Dual-polarized antenna 1750 may transmit amplified constant amplitude decomposed RF signal 1730 using vertically-polarized probe 1752-V. Dual-polarized antenna 1750 may also transmit amplified constant amplitude decomposed RF signal 1732 using horizontally-polarized probe 1752-H. Dual-polarized antenna 1750 may be part of a phased array antenna panel (not shown in FIG. 17). In practice, for example when used in conjunction with 5G wireless communications (5th generation mobile networks or 5th generation wireless systems), a phased array antenna panel may have one hundred and forty four (144) dual-polarized antennas 1750. When used in conjunction with commercial geostationary communication satellites or low earth orbit satellites, a phased array antenna panel may be even larger, and have, for example, four hundred (400) dual-polarized antennas 1750. In other examples, a phased array antenna panel may have any other number of dual-polarized antennas 1750. In one implementation, a single power amplifier 1740 is coupled to a single vertically-polarized probe 1752-V. In various implementations, a single power amplifier 1740 may be coupled to four, six, eight, sixteen, or any number of vertically-polarized probes 1752-V. For example, power amplifier 1740 may be coupled to each of vertically-polarized probes 1752-V, using, for example, a splitter, a plurality of amplifier cells, or other suitable means. Likewise, a single power amplifier 1742 may be coupled to one or any number of horizontally-polarized probes 1752-H. Thus, vertically-polarized probe 1752-V may transmit amplified constant amplitude decomposed RF signal 1730, and horizontally-polarized probe 1752-H may transmit amplified constant amplitude decomposed RF signal 1732.

By decomposing variable amplitude composite input signal 1710 into constant amplitude decomposed RF signals 1730 and 1732 prior to their amplification, power amplifiers 1740 and 1742 operate with more power efficiency. Moreover, power amplifiers 1740 and 1742 exhibit less non-linearity and introduce less distortion than would a power amplifier utilized to amplify variable amplitude composite signal 1710 without decomposition. In addition, a combiner is not utilized to combine the outputs of power amplifiers 1740 and 1742, thus avoiding loss or inter-modulation between power amplifiers 1740 and 1742. Further, by utilizing dual-polarized antenna 1750, outphasing transmitter 1700 transmits two constant amplitude decomposed RF signals using a single antenna element 1750. Thus, outphasing transmitter 1700 efficiently transmits constant amplitude decomposed RF signal 1730 as a vertically-polarized signal using vertically-polarized probe 1752-V, and efficiently transmits constant amplitude decomposed RF signal 1732 as a horizontally-polarized signal using horizontally-polarized probe 1752-H.

Figure 18:
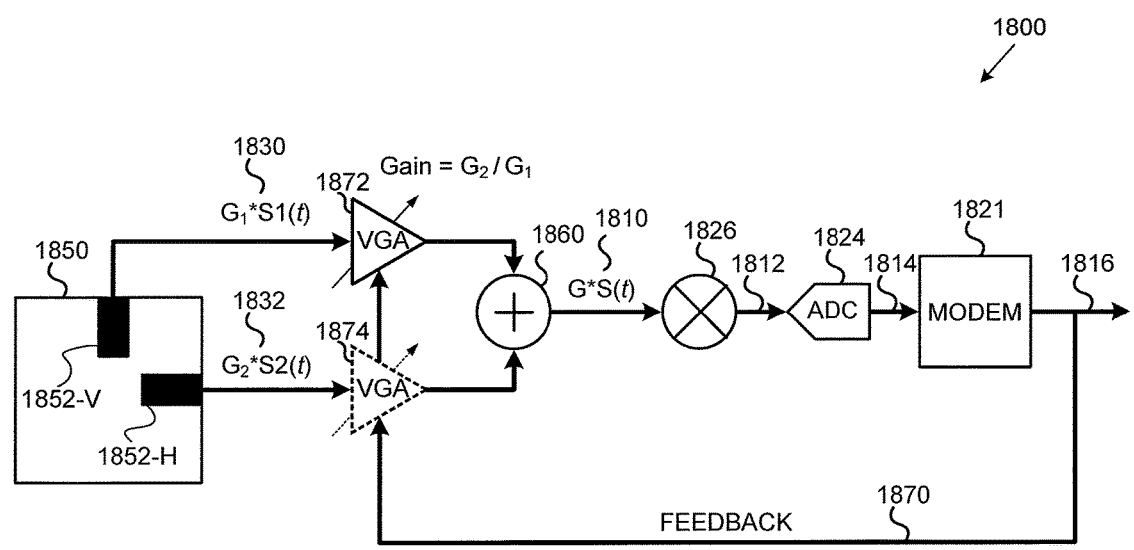
FIG. 18 illustrates an exemplary system diagram of a portion of an exemplary outphasing receiver according to one implementation of the present application.

FIG. 18 illustrates an exemplary system diagram of a portion of an exemplary outphasing receiver according to one implementation of the present application. As illustrated in FIG. 18, outphasing receiver 1800 includes dual-polarized antenna 1850, having vertically-polarized probe 1852-V and horizontally-polarized probe 1852-H, VGA 1872, optional VGA 1874, combiner 1860, mixer 1826, ADC 1824, modem 1821, output digital signal 1816, and feedback line 1870.

Outphasing receiver 1800 in FIG. 18 can be used in conjunction with outphasing transmitter 1600 of FIG. 16 or outphasing transmitter 1700 of FIG. 17. Dual-polarized antenna 1850 is configured to receive vertically-polarized signals using vertically-polarized probe 1852-V and to receive horizontally-polarized signals using horizontally-polarized probe 1852-H. For example, dual-polarized antenna 1850 may receive constant amplitude decomposed RF signal 1630 (or 1730) of FIG. 16 (or FIG. 17) using vertically-polarized probe 1852-V and may receive constant amplitude decomposed RF signal 1632 (or 1732) of FIG. 16 (or FIG. 17) using horizontally-polarized probe 1852-H. More specifically, dual-polarized antenna 1850 receives scaled versions of constant amplitude decomposed RF signals 1630 and 1632 (or 1730 and 1732), defined by $G_1*S1(t)$ 1830 and $G_2*S2(t)$ 1832 respectively, where $G_1$ and $G_2$ are respective gains of decomposed RF signals 1630 and 1632 (or 1730 and 1732) at outphasing receiver 1800. Dual-polarized antenna 1850 may be, for example, a dual-polarized patch antenna, a dual-polarized dipole antenna, or a dual-polarized slot antenna. Dual-polarized antennas 1850 may be part of a phased array antenna panel (not shown in FIG. 18) that may have any other number of antennas, as stated above.

As illustrated in FIG. 18, dual-polarized antenna 1850 is coupled to combiner 1860 through VGA 1872 and optional VGA 1874. Combiner 1860 combines scaled constant amplitude decomposed RF signals 1830 and 1832 into a scaled variable amplitude composite RF signal, defined by $G*S(t)$ 1810. Scaled variable amplitude composite RF signal 1810 is a scaled RF version of the original variable amplitude composite input signal 1610 (or 1710). Combiner 1860 is coupled to mixer 1826. Mixer 1826 downconverts scaled variable amplitude composite RF signal 1810 into scaled variable amplitude composite analog signal 1812. Mixer 1826 is coupled to ADC 1824. ADC 1824 converts scaled variable amplitude composite analog signal 1812 into scaled variable amplitude composite digital signal 1814. ADC 1824 is coupled to modem 1821. Modem 1821 produces an output digital signal 1816 based on scaled variable amplitude composite digital signal 1814. In various implementations, combiner 1860 may combine constant amplitude decomposed RF signals from four, six, eight, sixteen, or any number of antennas. In one implementation, an RF front end chip in a phased array antenna panel may include components of outphasing receiver 1800, such as VGA 1872, optional VGA 1874, combiner 1860, mixer 1826, ADC 1824, and modem 1821. Components of outphasing receiver 1800 may be coupled in an order other than the order described herein. Outphasing receiver 1800 may include additional components, such as additional signal conditioning circuitry.

Thus, outphasing receiver 1800 is configured to receive polarized constant amplitude decomposed RF signals, such as constant amplitude decomposed RF signals 1630 and 1632 (or 1730 and 1732), and compose a variable amplitude composite RF signal, such as scaled variable amplitude composite RF signal 1810. Since the constant amplitude RF signals are combined at the receiver end (e.g., at outphasing receiver 1800) to recompose the original variable amplitude RF signal, the need for combining RF signals at the transmitter end is avoided. Moreover, VGA 1872 and optional VGA 1874 are utilized to amplify constant amplitude RF signals, thus reducing power inefficiency and non-linearity associated with amplifying variable amplitude RF signals. Further, by utilizing dual-polarized antenna 1850, outphasing receiver 1800 receives two decomposed RF signals using a single antenna element 1850. Thus, outphasing receiver 1800 efficiently receives constant amplitude decomposed RF signal 1630 (or 1730) as a vertically-polarized signal using vertically-polarized probe 1852-V, efficiently receives constant amplitude decomposed RF signal 1632 (or 1732) as a horizontally-polarized signal using horizontally-polarized probe 1852-H, and efficiently recomposes them to generate scaled variable amplitude composite RF signal 1810.

As further illustrated in FIG. 18, modem 1821 is coupled to feedback line 1870. Different paths taken by constant amplitude decomposed RF signals, such as different paths taken by decomposed RF signals 1630 and 1632 (or 1730 and 1732), can cause imbalance in both gain and phase, and result in an increased bit error rate (BER) for the output digital signal 1816 at the receiver. Outphasing receiver 1800 can apply gain and phase adjustment to scaled constant amplitude composite RF signals 1830 and 1832 using feedback line 370 in order to compensate for such imbalance. For example, as show in FIG. 18, vertically-polarized probe 1852-V is coupled to VGA 1872 and scaled constant amplitude decomposed RF signal 1830 is input to VGA 1872. Feedback line 1870 couples modem 1821 to VGA 1872. Feedback line 1870 uses the BER as feedback to adjust the gain of VGA 1872 to compensate for gain imbalance and decrease the BER. In the present implementation, the gain of VGA 1872 is adjusted to $G_2/G_1$, where $G_1$ and $G_2$ are respective gains of decomposed RF signals 1630 and 1632 (or 1730 and 1732) at outphasing receiver 1800. In various implementations, feedback line 1870 may use optional VGA 1874, and the gains of VGA 1872 and optional VGA 1874 may be adjusted to values other than $G_2/G_1$. Feedback line 1870 may include additional components, such as phase adjustment circuitry.

Figure 19:
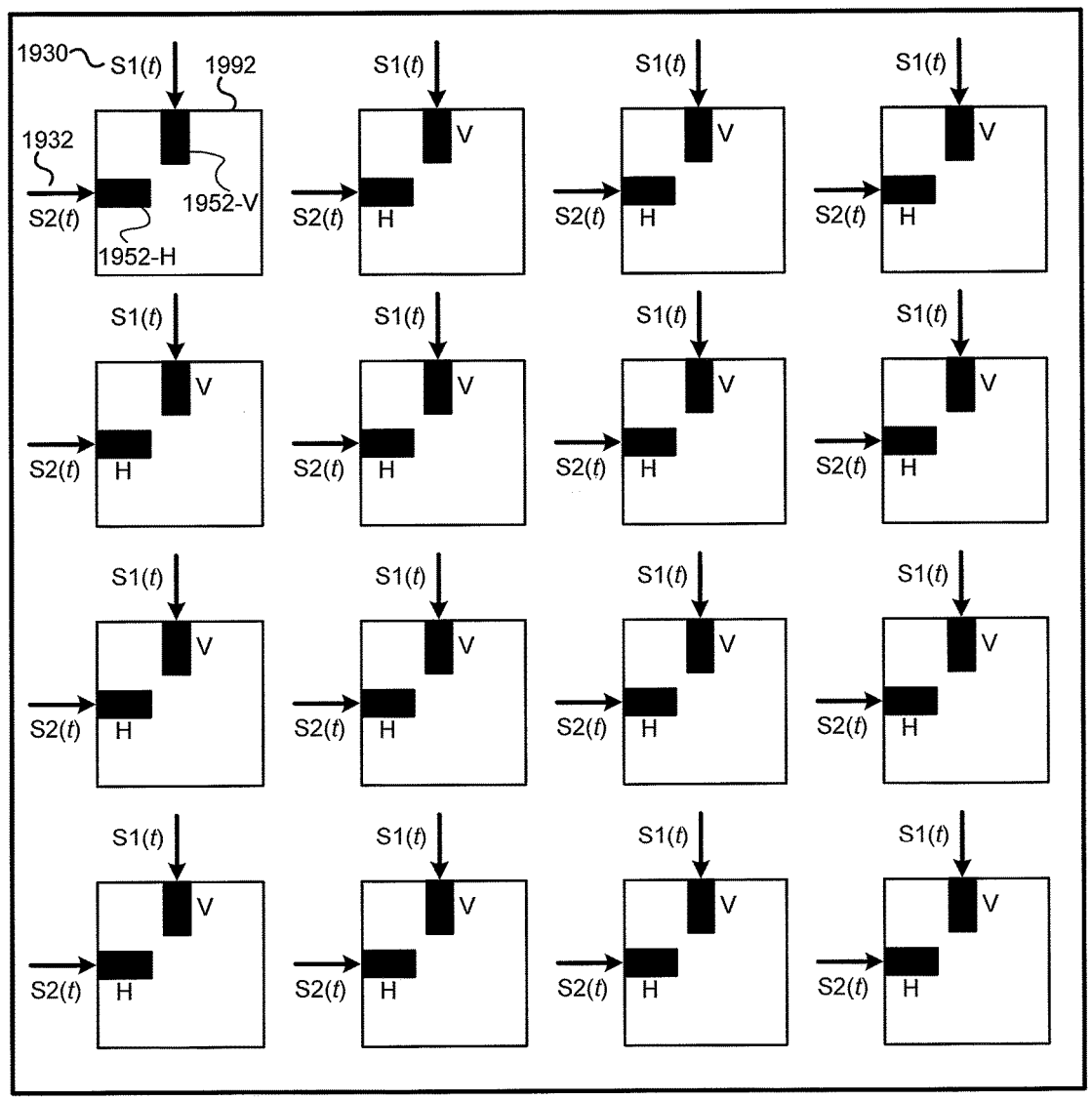
FIG. 19 illustrates a layout diagram of a portion of an exemplary phased array antenna panel according to one implementation of the present application.

FIG. 19 illustrates a layout diagram of a portion of an exemplary phased array antenna panel according to one implementation of the present application. As illustrated in FIG. 19, phased array antenna panel 1900 includes a plurality of dual-polarized antennas 1992, having vertically-polarized probes 1952-V and horizontally-polarized probes 1952-H. In the present implementation, dual-polarized antennas 1992 have a square shape and are arranged in a grid pattern in phased array antenna panel 1900. In one implementation, the distance between one dual-polarized antenna and an adjacent dual-polarized antenna is a fixed distance, such as a quarter wavelength (i.e., $\lambda/4$). Although FIG. 19 shows sixteen (16) dual-polarized antennas 1992, only a portion of phased array antenna panel 1900 is shown in FIG. 19. In practice, for example when used in conjunction with 5G wireless communications (5th generation mobile networks or 5th generation wireless systems), phased array antenna panel 1900 may be much larger, and may have one hundred and forty four (144) dual-polarized antennas 1992, arranged, for example, in a twelve (12) by twelve (12) grid pattern. When used in conjunction with commercial geostationary communication satellites or low earth orbit satellites, phased array antenna panel 1900 may be even larger, and have, for example, four hundred (400) dual-polarized antennas 1992. In other examples, phased array antenna panel 1900 may have any other number of dual-polarized antennas 1992. In one implementation, dual-polarized antennas 1992 may have a shape other than a square, such as a circle. In practice, vertically-polarized probes 1952-V and horizontally-polarized probes 1952-H may be situated in or over cubical or cylindrical cavities that accommodate more efficient transmission or reception of RF signals. Thus, antenna elements 1992 in FIG. 19 may represent a top view of a cubical cavity housing vertically-polarized probes 1952-V and horizontally-polarized probes 1952-H. Examples of various antennas that can be used in various implementations of the present application are shown and described in U.S. patent application Ser. No. 15/278,970 filed on Sep. 28, 2016 and titled "Low-Cost and Low-Loss Phased Array Antenna Panel," and U.S. patent application Ser. No. 15/279,171 filed on Sep. 28, 2016 and titled "Phased Array Antenna Panel Having Cavities with RF Shields for Antenna Probes." The disclosures in these related applications are hereby incorporated fully by reference into the present application. In one implementation, dual-polarized antennas 1992 may be arranged in a pattern other than a grid. In one implementation, the distance between one dual-polarized antenna and an adjacent dual-polarized antenna may be greater than a quarter wavelength (i.e., greater than $\lambda/4$).

In the present implementation, phased array antenna panel 1900 is a flat panel array employing dual-polarized antennas 1992 coupled to associated active circuits to form beams for transmission. In one implementation, the beams are formed fully electronically by means of phase and amplitude control circuits associated with dual-polarized antennas 1992. An example of beam forming using phase and amplitude control circuits utilizing dual-polarized antennas is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. Thus, phased array antenna panel 1900 can provide fully electronic beamforming without the use of mechanical parts.

Phased array antenna panel 1900 in FIG. 19 may be used as part of an outphasing transmitter, such as outphasing transmitter 1600 of FIG. 16 or outphasing transmitter 1700 of FIG. 17. Any of dual-polarized antennas 1992 in FIG. 19 generally corresponds to dual-polarized antenna 1650 (or 1750). In one implementation, a single power amplifier 1640 (or 1740) is coupled to a single one of vertically-polarized probes 1952-V. In various implementations, a single power amplifier 1640 (or 1740) may be coupled to four, six, eight, or any number of vertically-polarized probes 1952-V. For example, power amplifier 1640 (or 1740) may be coupled to each of vertically-polarized probes 1952-V, using, for example, a splitter, a plurality of amplifier cells, or other suitable means. Likewise, a single power amplifier 1642 (or 1742) may be coupled to one or any number of horizontally-polarized probes 1952-H. Thus, as illustrated in FIG. 19, constant amplitude decomposed RF signal 1930 is provided to each of vertically-polarized probes 1952-V in phased array antenna panel 1900, and constant amplitude decomposed RF signal 1932 is provided to each of horizontally-polarized probes 1952-H in phased array antenna panel 1900.

In 5G wireless communications, and wireless communications in relation to commercial geostationary satellites, low earth orbit satellites, and other beamforming applications, a phased array antenna panel employs numerous power amplifiers that use much of the phased array antenna panel's power. By decomposing a variable amplitude composite input signal into constant amplitude decomposed RF signals 1930 and 1932 prior to their amplification, power amplifiers in phased array antenna panel 1900 can operate with more power efficiency and less non-linearity. Thus, phased array antenna panel 1900 significantly improves power efficiency and performance in applications that employ numerous power amplifiers. Moreover, by utilizing dual polarized antennas 1992, phased array antenna panel 1900 efficiently transmits constant amplitude decomposed RF signal 1930 as a vertically-polarized signal using vertically-polarized probes 1952-V, and efficiently transmits constant amplitude decomposed RF signal 1932 as a horizontally-polarized signal using horizontally-polarized probes 1952-H.

Figure 20:
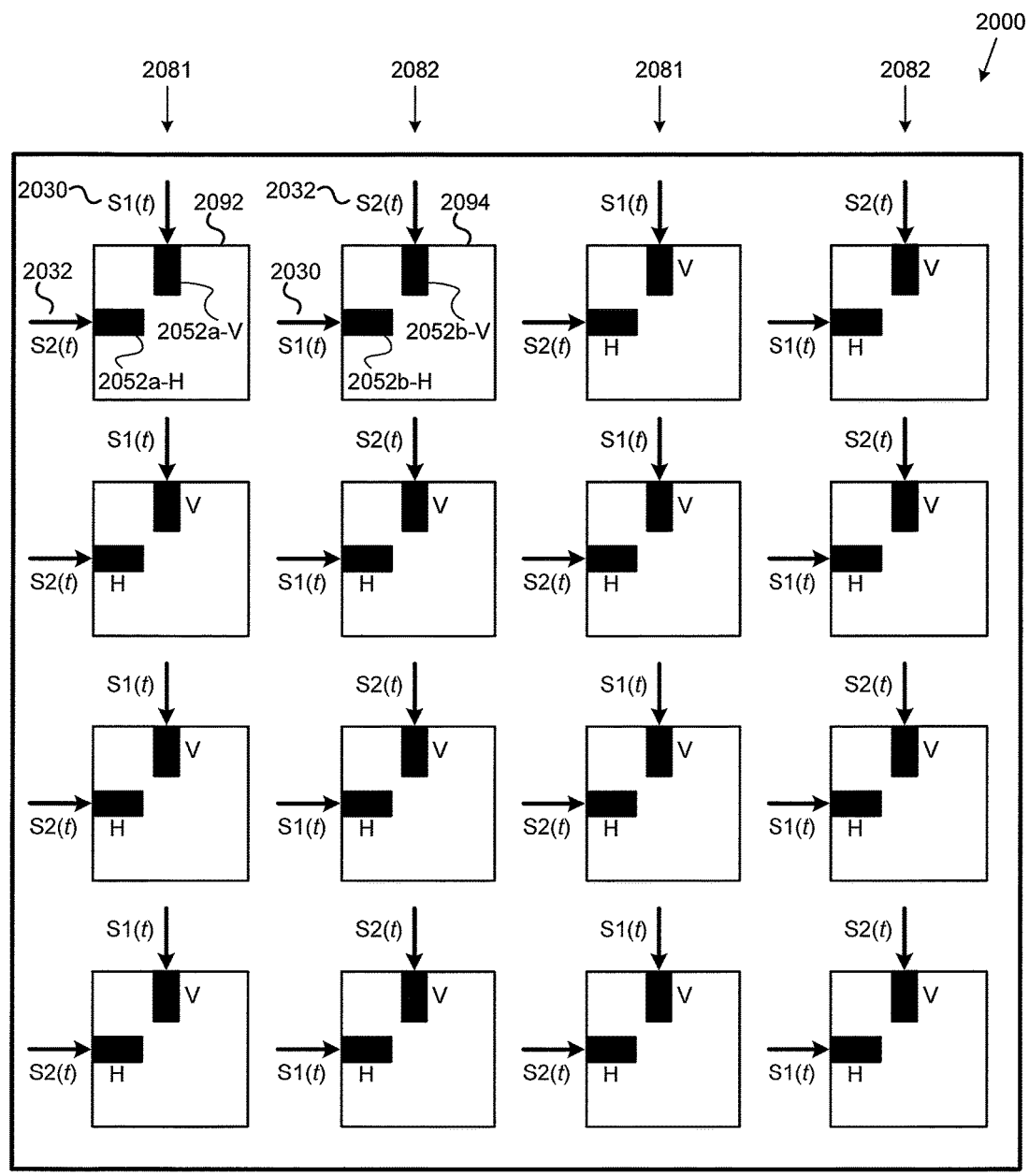
FIG. 20 illustrates a layout diagram of a portion of an exemplary phased array antenna panel according to one implementation of the present application.

FIG. 20 illustrates a layout diagram of a portion of an exemplary phased array antenna panel according to one implementation of the present application. As illustrated in FIG. 20, phased array antenna panel 2000 includes a plurality of dual-polarized antennas 2092 and 2094, having vertically-polarized probes 2052a-V and 2052b-V and horizontally-polarized probes 2052a-H and 2052b-H. In the present implementation, dual-polarized antennas 2092 and 2094 have a square shape and are arranged in a grid pattern in phased array antenna panel 2000. In one implementation, the distance between one dual-polarized antenna and an adjacent dual-polarized antenna is a fixed distance, such as a quarter wavelength (i.e., λ/4). Although FIG. 20 shows sixteen (16) dual-polarized antennas 2092 and 2094, only a portion of phased array antenna panel 2000 is shown in FIG. 20. In practice, for example when used in conjunction with 5G wireless communications (5th generation mobile networks or 5th generation wireless systems), phased array antenna panel 2000 may be much larger, and may have one hundred and forty four (144) dual-polarized antennas 2092 and 2094, arranged, for example, in a twelve (12) by twelve (12) grid pattern. When used in conjunction with commercial geostationary communication satellites or low earth orbit satellites, phased array antenna panel 2000 may be even larger, and have, for example, four hundred (400) dual-polarized antennas 2092 and 2094. In other examples, phased array antenna panel 2000 may have any other number of dual-polarized antennas 2092 and 2094. In one implementation, dual-polarized antennas 2092 and 2094 may have a shape other than a square, such as a circle. In practice, vertically-polarized probes 2052a-V and 2052b-V and horizontally-polarized probes 2052a-H and 2052b-H may be situated in or over cubical or cylindrical cavities that accommodate more efficient transmission or reception of RF signals. Thus, antenna elements 2092 and 2094 in FIG. 20 may represent a top view of a cubical cavity housing vertically-polarized probes 2052a-V and 2052b-V and horizontally-polarized probes 2052a-H and 2052b-H. Examples of various antennas that can be used in various implementations of the present application are shown and described in U.S. patent application Ser. No. 15/278,970 filed on Sep. 28, 2016 and titled "Low-Cost and Low-Loss Phased Array Antenna Panel," and U.S. patent application Ser. No. 15/279,171 filed on Sep. 28, 2016 and titled "Phased Array Antenna Panel Having Cavities with RF Shields for Antenna Probes." The disclosures in these related applications are hereby incorporated fully by reference into the present application. In one implementation, dual-polarized antennas 2092 and 2094 may be arranged in a pattern other than a grid. In one implementation, the distance between one dual-polarized antenna and an adjacent dual-polarized antenna may be greater than a quarter wavelength (i.e., greater than λ/4).

In the present implementation, phased array antenna panel 2000 is a flat panel array employing dual-polarized antennas 2092 and 2094 coupled to associated active circuits to form beams for transmission. In one implementation, the beams are formed fully electronically by means of phase and amplitude control circuits associated with dual-polarized antennas 2092 and 2094. An example of beam forming using phase and amplitude control circuits utilizing dual-polarized antennas is described in U.S. patent application Ser. No. 15/226,785 filed on Aug. 2, 2016, and titled "Large Scale Integration and Control of Antennas with Master Chip and Front End Chips on a Single Antenna Panel." The disclosure in this related application is hereby incorporated fully by reference into the present application. Thus, phased array antenna panel 2000 can provide fully electronic beamforming without the use of mechanical parts.

Phased array antenna panel 2000 in FIG. 20 may be used as part of an outphasing transmitter, such as outphasing transmitter 1600 of FIG. 16 or outphasing transmitter 1700 of FIG. 17. Any of dual-polarized antennas 2092 and 2094 in FIG. 20 generally corresponds to dual-polarized antenna 1650 (or 1750). In one implementation, a single power amplifier 1640 (or 1740) is coupled to a single one of vertically-polarized probes 2052a-V or to a single one of horizontally-polarized probes 2052b-H. In various implementations, a single power amplifier 1640 (or 1740) may be coupled to four, six, eight, or any number of vertically-polarized probes 2052a-V or horizontally-polarized probes 2052b-H. For example, power amplifier 1640 (or 1740) may be coupled to each of vertically-polarized probes 2052a-V and to each of horizontally-polarized probes 2052b-H, using, for example, a splitter, a plurality of amplifier cells, or other suitable means. Likewise, a single power amplifier 1642 (or 1742) may be coupled to one or any number of horizontally-polarized probes 2052a-H and vertically-polarized probes 2052b-V.

As illustrated in FIG. 20, phased array antenna panel 2000 includes odd columns 2081 and even columns 2082. Constant amplitude decomposed RF signal 2030 is provided to each of vertically-polarized probes 2052a-V in odd columns 2081, and constant amplitude decomposed RF signal 2032 is provided to each of horizontally-polarized probes 2052a-H in odd columns 2081. In an alternate fashion, constant amplitude decomposed RF signal 2032 is provided to each of vertically-polarized probes 2052b-V in even columns 2082, and constant amplitude decomposed RF signal 2030 is provided to each of horizontally-polarized probes 2052b-H in even columns 2082. As stated above, different paths taken by constant amplitude decomposed RF signals, such as different paths taken by constant amplitude decomposed RF signals 2030 and 2032, can cause imbalance in both gain and phase, and the receiver can apply gain and phase adjustment in order to compensate for such imbalance. In the present implementation, phased array antenna panel 2000 transmits constant amplitude decomposed RF signals 2030 and 2032 alternately using vertically-polarized probes 2052a-V and 2052b-V and horizontally-polarized probes 2052a-H and 2052b-H between odd columns 2081 and even columns 2082. By utilizing a plurality of dual-polarized antennas 2092 and 2094 to alternate assignment of constant amplitude decomposed RF signals 2030 and 2032, phased array antenna panel 2000 mitigates the imbalance between constant amplitude decomposed RF signals 2030 and 2032. In addition, phased array antenna panel 2000 eliminates or reduces the need to perform gain and phase adjustment at the receiver end. For example, in FIG. 18, the gain of VGA 1872 and the settling time of feedback line 1870 can be reduced. The various implementations and advantages of power efficiency and improvement in non-linearity and performance when utilizing dual-polarized antennas discussed in relation to phased array antenna panel 1900 in FIG. 19 may also apply to phased array antenna panel 2000 in FIG. 20.

Thus, various implementations of the present application achieve a transmitter and a wireless communication system that overcome the deficiencies in the art by using multiple beam phased array antenna panels with decomposed RF signals. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. An outphasing transmitter comprising:
a plurality of antennas in a phased array antenna panel, said plurality of antennas comprising a first non-overlapping sub-array and a second non-overlapping sub-array;
a combiner configured to combine a plurality of amplitude modulated and/or phase modulated beamforming signals into a composite input signal;
a decomposition block configured to decompose said composite input signal into a first decomposed RF signal and a second decomposed RF signal;
said first decomposed RF signal coupled to a first power amplifier;
said second decomposed RF signal coupled to a second power amplifier;
each antenna in said first non-overlapping sub-array being uniquely associated with said first power amplifier;
each antenna in said second non-overlapping sub-array being uniquely associated with said second power amplifier;
said phased array antenna panel forming a plurality of RF beams corresponding to said plurality of beamforming signals.

2. The outphasing transmitter of claim 1, wherein said plurality of RF beams are directed toward a plurality of receivers.

3. The outphasing transmitter of claim 1, wherein said first decomposed RF signal and said second decomposed RF signal are constant amplitude signals.

4. An outphasing transmitter comprising:
a plurality of interleaved antenna rows in a phased array antenna panel;
a combiner configured to combine a plurality of amplitude modulated and/or phase modulated beamforming signals into a composite input signal;
a decomposition block configured to decompose said composite input signal into a first decomposed RF signal and a second decomposed RF signal;
said first decomposed RF signal coupled to a first power amplifier;
said second decomposed RF signal coupled to a second power amplifier;
each antenna in a first group of rows in said plurality of interleaved antenna rows being uniquely associated with said first power amplifier;
each antenna in a second group of rows in said plurality of interleaved antenna rows being uniquely associated with said second power amplifier;
said phased array antenna panel forming a plurality of RF beams corresponding to said plurality of beamforming signals.

5. The outphasing transmitter of claim 4, wherein said plurality of RF beams are directed toward a plurality of receivers.

6. The outphasing transmitter of claim 4, wherein said first decomposed RF signal and said second decomposed RF signal are constant amplitude signals.

7. An outphasing transmitter utilizing a phased array antenna panel, said outphasing transmitter comprising:
a combiner configured to combine a plurality of beamforming signals into a composite input signal;
a decomposition block configured to decompose said composite input signal into a first decomposed RF signal and a second decomposed RF signal;
said first decomposed RF signal coupled to a first power amplifier;
said second decomposed RF signal coupled to a second power amplifier;
a first random plurality of antennas being randomly hard-wired to said first power amplifier;
a second random plurality of antennas being randomly hard-wired to said second power amplifier;
said phased array antenna panel forming a plurality of RF beams corresponding to said plurality of beamforming signals.

8. The outphasing transmitter of claim 7, wherein said first random plurality of antennas is non-uniformly spaced.

9. The outphasing transmitter of claim 7, wherein said plurality of RF beams are directed toward a plurality of receivers.

10. The outphasing transmitter of claim 7, wherein said first decomposed RF signal and said second decomposed RF signal are constant amplitude signals.

11. An outphasing transmitter utilizing a phased array antenna panel, said outphasing transmitter comprising:
a combiner configured to combine a plurality of beamforming signals into a composite input signal;
a decomposition on block configured to decompose a composite input signal into a first decomposed RF signal and a second decomposed RF signal;
said first decomposed RF signal coupled to a first power amplifier;
said second decomposed RF signal coupled to a second power amplifier;
a first plurality of antennas being dynamically and selectably assigned to said first power amplifier;
a second plurality of antennas being dynamically and selectably assigned to said second power amplifier;
said phased array antenna panel forming a plurality of RF beams corresponding to said plurality of beamforming signals.

12. The outphasing transmitter of claim 11, wherein said outphasing transmitter dynamically assigns said first plurality of antennas to said first power amplifier by at least one switch.

13. The outphasing transmitter of claim 11, wherein said outphasing transmitter dynamically assigns said first plurality of antennas to said first power amplifier based upon a direction of said plurality of RF beams.

14. The outphasing transmitter of claim 11, wherein said outphasing transmitter dynamically assigns said first plurality of antennas to said first power amplifier by referencing a lookup table.

15. The outphasing transmitter of claim 11, wherein said outphasing transmitter dynamically assigns said first plurality of antennas to said first power amplifier in a random assignment.

16. The outphasing transmitter of claim 11, wherein said plurality of RF beams are directed toward a plurality of receivers.

17. The outphasing transmitter of claim 11, wherein said first decomposed RF signal and said second decomposed RF signal are constant amplitude signals.

18. An outphasing transmitter comprising:
- a combiner configured to combine a plurality of beamforming signals into a composite input signal;
- a decomposition block configured to decompose said composite input signal into a first decomposed RF signal and a second decomposed RF signal;
- said first decomposed RF signal coupled to a first power amplifier;
- said second decomposed RF signal coupled to a second power amplifier;
- said first power amplifier coupled to a vertically-polarized probe of a dual-polarized antenna in a phased array antenna panel;
- said second power amplifier coupled to a horizontally-polarized probe of said dual-polarized antenna in said phased array antenna panel;
- said phased array antenna panel forming a plurality of RF beams corresponding to said plurality of beamforming signals.

19. The outphasing transmitter of claim 18, wherein said plurality of RF beams are directed toward a plurality of receivers.

20. The outphasing transmitter of claim 18, wherein said first decomposed RF signal and said second decomposed RF signal are constant amplitude signals.

* * * * *